US012590024B2

(12) United States Patent
Wagner et al.

(10) Patent No.: US 12,590,024 B2
(45) Date of Patent: Mar. 31, 2026

(54) METHOD FOR SEPARATING SUBSTRATES

(71) Applicant: SCHOTT AG, Mainz (DE)

(72) Inventors: Fabian Wagner, Mainz (DE); Volker Plapper, Alzey (DE); Andreas Ortner, Gau-Algesheim (DE); Simon Schmitt, Wiesbaden (DE); Frank-Thomas Lentes, Bingen (DE); Albrecht Seidl, Niedernberg (DE); Antal Makacs, Grossschwabhausen (DE); Patrick Bartholome, Jena (DE)

(73) Assignee: SCHOTT AG, Mainz (DE)

( * ) Notice: Subject to any disclaimer, the term of this patent is extended or adjusted under 35 U.S.C. 154(b) by 922 days.

(21) Appl. No.: 17/738,530

(22) Filed: May 6, 2022

(65) Prior Publication Data

US 2022/0267189 A1 Aug. 25, 2022

Related U.S. Application Data

(63) Continuation of application No. 16/459,914, filed on Jul. 2, 2019, now Pat. No. 11,618,707, which is a
(Continued)

(30) Foreign Application Priority Data

Jan. 2, 2017 (DE) .................... 10 2017 100 015.1

(51) Int. Cl.
 *C03B 33/02* (2006.01)
 *B23K 26/00* (2014.01)
(Continued)

(52) U.S. Cl.
 CPC ...... *C03B 33/0222* (2013.01); *B23K 26/0006* (2013.01); *B23K 26/53* (2015.10); *B23K 2103/54* (2018.08)

(58) Field of Classification Search
 CPC . C03B 33/0222; C03B 33/033; C03B 33/037; C03B 33/082; C03B 33/091;
(Continued)

(56) References Cited

U.S. PATENT DOCUMENTS

2010/0078417 A1 4/2010 Abramov
2013/0126573 A1 5/2013 Hosseini
(Continued)

FOREIGN PATENT DOCUMENTS

CN 101712529 5/2010
CN 105102386 11/2015
(Continued)

OTHER PUBLICATIONS

English translation of International Search Report dated Apr. 24, 2018 for corresponding International Patent Application No. PCT/EP2017/084177, 2 pages.
(Continued)

*Primary Examiner* — Hung D Nguyen
(74) *Attorney, Agent, or Firm* — Ruggiero McAllister & McMahon LLC

(57) ABSTRACT

A method for separating a substrate of a brittle-hard material is provided. The method includes the steps of introducing defects into the substrate at a spacing from one another along a separation line using at least one pulsed laser beam; selecting an average spacing between neighboring defects and a number of laser pulses for generating a respective defect such that a breaking stress ($\sigma_B$) for separating the substrate along the separation line is smaller than a first reference stress ($\sigma_{R1}$) of the substrate and such that an edge strength $\sigma_K$ of the separation edge obtained after separation is greater than a second reference stress ($\sigma_{R2}$) of the substrate; and separating the substrate after introducing the defects by applying a stress along the separation line.

7 Claims, 11 Drawing Sheets

Related U.S. Application Data continuation of application No. PCT/EP2017/084177, filed on Dec. 21, 2017.

(51) Int. Cl.

| | | |
|---|---|---|
| *B23K 26/53* | (2014.01) | |
| *B23K 103/00* | (2006.01) | |

(58) Field of Classification Search
CPC ..... C03B 33/093; C03B 33/10; C03B 33/102; C03B 33/105; B23K 26/0006; B23K 26/36–388; B23K 26/40–402; B23K 26/50–53; B23K 2103/50; B23K 2103/52; B23K 2103/54; B23K 2103/56; Y02P 40/57
See application file for complete search history.

(56) References Cited

U.S. PATENT DOCUMENTS

| | | |
|---|---|---|
| 2014/0340730 A1 | 11/2014 | Bergh |
| 2015/0165548 A1 | 6/2015 | Marjanovic |
| 2015/0232369 A1 | 8/2015 | Marjanovic |
| 2016/0002103 A1* | 1/2016 | Wang ..................... C03C 3/091 |
| | | 428/141 |
| 2016/0031745 A1 | 2/2016 | Ortner |
| 2016/0033379 A1 | 2/2016 | Heiss-Chouquet |
| 2016/0200621 A1 | 7/2016 | N'Gom |
| 2017/0036304 A1 | 2/2017 | Masuda |

FOREIGN PATENT DOCUMENTS

| | | |
|---|---|---|
| CN | 106102983 | 11/2016 |
| DE | 102012110971 | 5/2014 |
| DE | 102014110855 | 2/2016 |
| JP | WO2015182300 | 4/2017 |
| KR | 20140138456 | 12/2014 |
| WO | 2012006736 | 1/2012 |
| WO | 2015113026 | 7/2015 |

OTHER PUBLICATIONS

English translation of International Preliminary Report on Patentability dated Jul. 11, 2019 for corresponding International Patent Application No. PCT/EP2017/084177, 9 pages.

English translation of Written Opinion dated Apr. 24, 2018 for corresponding International Patent Application No. PCT/EP2017/084177, 7 pages.

Din En 843-1, "Advanced technical ceramics—Mechanical properties of monolithic ceramics at room temperature—Part 1: Determination of flexural strength", Aug. 2008, 22 pages.

Deng, "Molecular Diagnosis of Animal Diseases", with English machine translation, Apr. 30, 2014, 7 pages.

* cited by examiner

METHOD FOR SEPARATING SUBSTRATES

CROSS REFERENCE TO RELATED APPLICATIONS

This application is a continuation of U.S. application Ser. No. 16/459,914 filed Jul. 2, 2019, which is a continuation of International Application PCT/EP2017/084177 filed Dec. 21, 2017, which claims benefit under 35 USC § 119 of German Application 10 2017 100 015.1 filed Jan. 2, 2017, the entire contents of all of which are incorporated herein by reference.

BACKGROUND

1. Field of the Invention

The invention relates to a method for laser-assisted separation of substrates, in particular substrates made of glass, glass ceramics, or silicon, in which defects are introduced into the substrate at a spacing from one another along a predetermined separation line using a pulsed laser beam. The invention furthermore relates to a workpiece, in particular a glass product, a glass ceramic product, and/or a silicon product, which includes defects that are spaced-apart along a separation line.

2. Description of Related Art

One cutting method widely used in glass industry is mechanical scribing and breaking. The method is cost-effective, but is essentially limited to straight cuts. After the breaking, the edges often do not have a sufficient quality, so that complex post-processing might be necessary, e.g. by grinding or polishing.

Another method is water-jet cutting, which allows free-form geometries but is rather slow and expensive, at the same time with limited quality, so that further post-processing of the edge is typically necessary with this process as well. Therefore, the water-jet cutting method is mainly employed for complex geometries which cannot be produced by scribing and breaking and optional subsequent post-processing.

In the method of thermal laser scribing, the glass is heated, for example by a $CO_2$ laser, along the cutting line and is immediately cooled down again. This makes it possible to achieve high edge qualities while producing free-form geometries, although the radii of curvature of the cut edge must not be too small. However, the laser scribing is not suitable, or only at a high loss of quality, for glasses having a greater thickness, and especially not for glasses having a low coefficient of thermal expansion.

Against this background, the method of laser filamentation appears particularly promising. Here, an ultrashort pulsed laser is used to introduced a separation line into the glass, e.g. in the form of a perforation.

As described in WO 2012/006736 A2, for example, it is possible with a pulsed focused laser beam to produce filaments in a transparent substrate, and a path formed by a plurality of filaments makes it possible to separate the substrate. A filament is produced by a high-energy short laser pulse, and it is assumed that the non-linear optical Kerr effect causes self-focusing of the laser beam thereby causing plasma formation.

DE 10 2012 110 971 A1 also describes a method for preparing the separation of transparent workpieces, in which filament formations extending across the workpiece and being lined up next to one another are produced by ultrashort laser pulses along a predetermined breaking line.

After a filament path has been introduced into the glass by laser filamentation, in particular in the form of a line of preliminary defects or a perforation line, the glass can be separated in a further step, known as cleaving. For this purpose, the filament path is traced by a $CO_2$ laser, so that the glass separates along the filament path and thus along an intended separation line. However, during the cleavage step, in particular in the case of complex geometries or materials with a low coefficient of thermal expansion, errors may occur, for example in that the crack does not follow the preliminarily introduced separation line and runs away, or in that the crack does not start or stops. It has been found that such issues may present itself in different ways for different glasses, i.e. sometimes will also depend on the glass to be separated.

SUMMARY

A general object of the invention, therefore, is to optimize the process of laser filamentation including the subsequent cleaving step, in particular with regard to the respective material to be separated.

One aspect of the object of the invention includes to improve the quality of the separation edge.

The invention accordingly relates to a method for separating a substrate, in particular a substrate made of brittle-hard material, especially glass, glass ceramics, and/or silicon, wherein defects are introduced into the substrate at a spacing from one another along a predetermined separation line using at least one pulsed laser beam.

Accordingly, filamentary defects are produced next to one another in the volume of the substrate along a separation line, and the substrate may in particular be provided in the form of a sheet-like glass element, a sheet-like glass ceramic element, or a flat silicon wafer. The filamentary defects are produced by laser pulses of a laser, in particular by generating a plasma in the volume of the glass by the laser pulses, wherein the material of the substrate is transparent to the laser pulses, and the points of incidence of the laser pulses are displaced over the surface of the substrate along the separation line.

When introducing the defects, both the average spacing between neighboring defects and the number of laser pulses for generating a respective defect are selected such that a) the breaking stress $\sigma_B$ for separating the substrate along the separation line is smaller than a first reference stress $\sigma_{R1}$ that depends on the respective substrate; b) the edge strength $\sigma_K$ of the separation edge obtained after the separation is greater than a second reference stress $\sigma_{R2}$ that depends on the respective substrate; and c) after introducing the defects, the substrate can be separated by applying a stress along the separation line.

In other words, the laser filamentation is performed with regard to the breaking stress of the substrate, and in particular the number of pulses that are shot to individual perforation points and the spacing of the filaments is preselected accordingly. Furthermore, it is also possible to preselect the time difference between the individual pulses for the generation of a filament.

Breaking stress $\sigma_B$ herein refers to the stress required to separate the substrate along the separation line after the defects have been introduced, i.e. to open the filamentation channel. For the breaking stress, $\sigma_B < \sigma_{R1}$ applies, wherein the first reference stress $\sigma_{R1}$ is a value that depends on the substrate, in particular a value that depends on the material of the substrate and/or its properties.

Furthermore, the edge strength can be influenced via the filamentation parameters. Edge strength $\sigma_K$ refers to the stress that has to be applied in order to create a crack in the substrate presenting the separation edge as obtained after separation and to cause the substrate to break. For the edge strength, $\sigma_K > \sigma_{R2}$ applies, wherein the second reference stress $\sigma_{R2}$ again indicates a value that depends on the substrate, in particular a value that depends on the material of the substrate and/or its properties.

It may in particular be contemplated that the first and second reference stresses are identical and are given as a maximum thermal stress which depends on the material of the substrate, i.e. $\sigma_{R1} = \sigma_{R2} = \sigma_{th}$. Maximum thermal stress $\sigma_{th}$ herein refers to the stress which can at most be achieved by heating the substrate at a point, in particular by a $CO_2$ laser.

The maximum thermal stress $\sigma_{th}$ can in particular be determined according to the formula: $\sigma_{th} = 0.5 \cdot \alpha \cdot E \cdot (T_g - 100°$ C.$)$, wherein $\alpha$ is the coefficient of thermal expansion of the substrate material, E is the Young's modulus of the substrate material, and $T_g$ is the glass transition temperature of the substrate material.

In a DOE test series, which will be discussed in more detail below, it was experimentally confirmed that under the conditions mentioned, in particular $\sigma_B < 0.5 \cdot \alpha \cdot E \cdot (T_g - 100°$ C.$)$ and $\sigma_K > 0.5 \cdot \alpha \cdot E \cdot (T_g - 100°$ C.$)$, the cleaving step is particularly successful for samples of different glasses.

According to a preferred embodiment it is suggested that $\sigma_{R1} \le C_{R1} \cdot \alpha \cdot E \cdot (T_g - 100°$ C.$)$ applies to the first reference stress and $\sigma_{R2} \ge C_{R2} \cdot \alpha \cdot E \cdot (T_g - 100°$ C.$)$ applies to the second reference stress, wherein $C_{R1}$ and $C_{R2}$ are reference stress coefficients, with $C_{R1} = 0.5/k$ and $C_{R2} = 0.5*$, and with $k = 1.5$, preferably $k = 2$, more preferably $k = 2.5$; and wherein $\alpha$ is again the coefficient of thermal expansion of the substrate material, E is the Young's modulus of the substrate material, and $T_g$ is the glass transition temperature of the substrate material.

Accordingly, it is therefore particularly preferred, for example, that $\sigma_B < 0.25 \cdot \alpha \cdot E \cdot (T_g - 100°$ C.$)$ applies to the breaking stress, and that $\sigma_K > 0.5 \cdot \alpha \cdot E \cdot (T_g - 100°$ C.$)$ applies to the edge strength. It may even be more preferred that $\sigma_B < 0.25 \cdot E \cdot (T_g - 100°$ C.$)$ applies to the breaking stress, and that $\sigma_K > \alpha \cdot E \cdot (T_g - 100°$ C.$)$ applies to the edge strength. It is worth noting, that it is furthermore preferable that $\sigma_B > \frac{1}{20} \cdot \alpha \cdot E \cdot (T_g - 100°$ C.$)$ applies to the breaking stress.

For example, if the value of the thermally induced stress of the cleaving step is above the upper limit of the breaking stress, the substrate might relax locally, due to the proximity to $T_g$, i.e. the necessary stress cannot be built up and the cleaving step will fail, considering here the mean value of the stress distribution.

The above statements apply in particular to substrates made of glass which have not been toughened. In the case of a toughened substrate or glass, by contrast, the value of the coefficient of thermal expansion $\alpha$ is less decisive. By contrast, the inner tensile stress, also known as center tension, $\sigma_{CT}$, will be more important.

In one embodiment for separating in particular a chemically toughened substrate that is preferably made of glass, it is accordingly contemplated that the first and the second reference stresses are identical and are given as an inner tensile stress $\sigma_{CT}$ defined by the properties of the toughened substrate, i.e. $\sigma_{R1} = \sigma_{R2} = \sigma_{CT}$.

In particular in the case of a chemically toughened (pre-stressed) substrate, the inner tensile stress $\sigma_{CT}$ may be determined according to the formula: $\sigma_{CT} = (\sigma_{CS} \cdot d_L)/(d -$ $2d_L)$, wherein $\sigma_{CS}$ indicates the surface compressive stress or compaction stress of the toughened substrate, d denotes the thickness of the substrate, in particular of the sheet-like glass substrate, and $d_L$ indicates the penetration depth or depth of layer (DoL) of the preliminary stress (pre-stress), in other words the distance of the zero crossing of the stress from the substrate surface or the thickness of the preliminarily stressed layer of the substrate.

In particular in the case of a thermally toughened substrate, the inner tensile stress $\sigma_{CT}$ may be determined according to the formula: $\sigma_{CT} = \sigma_{CS}/2$, wherein $\sigma_{CS}$ indicates the surface compressive stress or compaction stress of the toughened substrate.

For the process of cleaving, it may thus be preferable to set the breaking stress so as to be lower than the inner tensile stress $\sigma_{CT}$, while the edge strength is set to be significantly greater. For the process of cleaving, it may thus be particularly preferable to set the breaking stress so as to be lower than the sum of inner tensile stress $\sigma_{CT}$ and thermal stress $\sigma_{th}$, while the edge strength is set to be greater, in particular significantly greater.

Regardless of whether a toughened or non-toughened substrate is considered, after the introduction of the defects, a point of incidence of laser radiation, preferably of a $CO_2$ laser, may be moved over the substrate along the separation line to induce the stress that has to be applied along the separation line for the separation. This step is also referred to as a cleaving step and is advantageously performed by the aforementioned measures.

With the cleaving step, local thermo-mechanical stresses are induced in the substrate along the separation line, i.e. in particular in the glass element or silicon element, in order to cause cracking between neighboring filamentary defects, i.e. to connect adjacent filamentary defects through cracks.

In this way, the perforation can be completed to form an at least partial separation slit, i.e. at least partial separation or severing of the substrate can be achieved along the separation line. Preferably, a complete separation slit is caused.

With the breaking stress or edge strength set as described above, the conditions for a successful cleaving step are optimized in a number of aspects.

On the one hand, separation of the perforation line even succeeds in materials having a relatively low coefficient of thermal expansion $\alpha$. In particular materials or glasses with $\alpha < 5 \cdot 10^{-6}$ $K^{-1}$, preferably with $\alpha < 4.5 \cdot 10^{-6}$ $K^{-1}$, most preferably with $\alpha < 4 \cdot 10^{-6}$ $K^{-1}$ can be separated successfully. This was verified by DOE experiments that will be described in more detail further below.

On the other hand, a larger lateral deviation of the laser spot from the perforation line can be allowed during the cleaving step, i.e. the positional tolerance of the point of incidence of the $CO_2$ laser is allowed to be less precise without the cleaving step failing. While, conventionally, such lateral deviation should be less than 500 μm, the method of the invention advantageously allows to tolerate lateral deviations of up to 3 mm. This was also confirmed in the context of the experiments discussed further below, especially for materials with $\alpha < 4.5 \cdot 10^{-6}$ $K^{-1}$ that had been provided with filaments as described, i.e. which were perforated.

Furthermore, with the same advance rate it is moreover advantageously possible to reduce the power of the laser used for the cleaving.

The defect generation relies on the use of a laser which preferably emits ultrashort laser pulses (USP laser). The laser pulses generate filamentary defects precisely along the predetermined separation line across the preferably sheet-like substrate by locally destructing the material in the interaction zone with the laser light. The defects are typically in the form of defined linear defects having a length that can be influenced by selecting suitable pulse energies and pulse durations. By producing a plurality of appropriately spaced filaments, perforation of the material is achieved.

With such microperforation, a very high edge quality is achieved at the cut edges of the substrate. Thus, the process is a precision separation method which ensures high and defined edge quality and thus results in particular in a high and defined edge strength or bending strength of the substrate after separation. The achieved edge qualities are in particular high enough to often allow subsequent sanding of the edges to be dispensed with.

The defects are in particular generated while operating the ultrashort pulsed laser in the so-called burst mode. In this operation mode, the laser pulse is not emitted as a single pulse, but as a sequence of pulses emitted in quick succession, which together form a pulse packet known as burst, and a defects is preferably generated by one burst.

Such a pulse packet usually has a slightly greater energy than a single pulse in the conventional single-shot operation. But the individual pulses of a burst have significantly less energy than a single pulse. With regard to the pulses within a burst, provision may be made for the pulse energies to be flexibly adjustable, in particular so that the pulse energies either remain substantially constant or so that the pulse energies increase or so that the pulse energies decrease.

A suitable laser source according to the present invention is a neodymium-doped yttrium-aluminum-garnet laser having a wavelength of 1064 nanometers.

The laser source generates a raw beam with a $(1/e^2)$ diameter of 12 mm, for example, and a biconvex lens with a focal length of 16 mm can be used as optics. For generating the raw beam, suitable beam-forming optics such as a Galilean telescope may optionally be used.

The laser source in particular operates at a repetition rate between 1 kHz and 1000 kHz, preferably between 10 kHz and 400 kHz, most preferably between 30 kHz and 200 kHz.

The repetition rate and/or scanning rate can be selected such that the desired spacing between adjacent filamentary defects is achieved.

A suitable pulse duration of a laser pulse is in a range of less than 100 picoseconds, preferably less than 20 picoseconds.

The typical power of the laser source is most favorably in a range from 20 to 300 watts. According to one advantageous embodiment of the invention, a pulse energy per burst of more than 400 microjoules is used, and furthermore advantageously a total burst energy of more than 500 microjoules, in order to achieve the filamentary defects.

When the ultrashort pulsed laser is operated in the burst mode, the repetition rate is the repetition rate of burst emission. Pulse duration is essentially independent of whether a laser is operated in the single-pulse mode or in the burst mode. The pulses within a burst typically have a similar pulse length as a pulse in single-pulse mode. The burst frequency may be in the interval [15 MHz, 90 MHz], preferably in the interval [20 MHz, 85 MHz] and is for example 50 MHz, and the number of pulses in the burst may range between 1 and 10 pulses, e.g. 6 pulses.

In the context of the invention, for introducing the defects, the average spacing between neighboring defects and the number of laser pulses for generating a respective defect is selected with regard to the breaking stress $\sigma_B$ and edge strength $\sigma_K$.

In particular, the number of laser pulses for generating a respective defect is selected from the interval [1, 20], preferably from the interval [1, 10], most preferably from the interval [2, 8].

The average spacing between neighboring defects is in particular selected from the interval [1 μm, 10 μm], preferably from the interval [3 μm, 8 μm], most preferably from the interval [5 μm, 7 μm]. The intervals have in particular to be understood continuously, although in one embodiment of the invention it may also be intended that these are discrete intervals. Preferably, a standard deviation of the spacing between neighboring defects is less than 1 μm.

With these spacings, in particular with rather large spacings of >5 μm, preferably >7 μm provided between the individual filaments, it is possible to adjust a suitable breaking stress by the filamentation, as will be apparent from the test series discussed further below.

The fact that preferably a rather large spacing is selected is surprising, as it had previously been assumed that with increasing spacings the breaking force would steadily increase. However, this relationship has not been verified, as will be shown below. It is assumed that the assumption of increasing breaking force only applies for spacings of more than 8 μm.

Since, in contrast to the burst, this effect or the burst spacing moreover has a positive influence on edge roughness, a large spacing of the filaments is particularly advantageous. In other words, large spacings between the defects result in smoother edges. In this respect, the choice of larger spacings of the filaments is advantageous. Furthermore, this has a positive impact on the advance rate, since much higher cutting speeds can be achieved with lasers of the same frequency in this way.

In a first more specific embodiment of the invention, the material of the substrate has a coefficient of thermal expansion in the interval $[3 \cdot 10^{-6} \text{ K}^{-1}, 4 \cdot 10^{-6} \text{ K}^{-1}]$, a Young's modulus in the interval [69 kN/mm$^2$, 76 kN/mm$^2$], and/or a glass transition temperature in the interval [700° C., 800° C.].

In this first more specific embodiment, the average spacing between neighboring defects is selected from the interval [6 μm, 8 μm], and the number of laser pulses for generating a respective defect is selected from the interval [7, 9].

In a second more specific embodiment of the invention, the material of the substrate has a coefficient of thermal expansion in the interval $[7 \cdot 10^{-6} \text{ K}^{-1}, 8 \cdot 10^{-6} \text{ K}^{-1}]$, a Young's modulus in the interval [69 kN/mm$^2$, 76 kN/mm$^2$], and/or a glass transition temperature in the interval [500° C., 600° C.].

In this second more specific embodiment, the average spacing between neighboring defects is selected from the interval [6 μm, 8 μm], and the number of laser pulses for generating a respective defect is selected from the interval [1, 3].

In a third more specific embodiment of the invention, the material of the substrate has a coefficient of thermal expansion in the interval $[3 \cdot 10^{-6} \text{ K}^{-1}, 4 \cdot 10^{-6} \text{ K}^{-1}]$, a Young's modulus in the interval [60 kN/mm$^2$, 68 kN/mm$^2$], and/or a glass transition temperature in the interval [500° C., 600° C.].

In this third more specific embodiment, either the average spacing between neighboring defects is selected from the interval [4 μm, 8 μm] and the number of laser pulses for generating a respective defect is selected from the interval

[7, 9], or the average spacing between neighboring defects is selected from the interval [6 μm, 8 μm] and the number of laser pulses for generating a respective defect is selected from the interval [3, 5].

Irrespectively of the three aforementioned more specific embodiments and optionally in combination with these more specific embodiments, the substrate may comprise or may be made of material of a particular type of glass and/or glass composition.

For example, the substrate may be a lithium aluminosilicate glass of the following composition (in wt %):

| Composition | (wt %) |
| --- | --- |
| $SiO_2$ | 55-69 |
| $Al_2O_3$ | 18-25 |
| $Li_2O$ | 3-5 |
| $Na_2O + K_2O$ | 0-30 |
| $MgO + CaO + SrO + BaO$ | 0-5 |
| $ZnO$ | 0-4 |
| $TiO_2$ | 0-5 |
| $ZrO_2$ | 0-5 |
| $TiO_2 + ZrO_2 + SnO_2$ | 2-6 |
| $P_2O_5$ | 0-8 |
| F | 0-1 |
| $B_2O_3$ | 0-2 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

In particular, a material of the aforementioned composition may have a coefficient of thermal expansion between $3 \cdot 10^{-6}$ $K^{-1}$ and $6 \cdot 10^{-6} K^{-1}$ or between $3.3 \cdot 10^{-6}$ $K^{-1}$ and $5.7 \cdot 10^{-6}$ $K^{-1}$.

Preferably, the lithium aluminosilicate glass has the following composition (in wt %):

| Composition | (wt %) |
| --- | --- |
| $SiO_2$ | 57-66 |
| $Al_2O_3$ | 18-23 |
| $Li_2O$ | 3-5 |
| $Na_2O + K_2O$ | 3-25 |
| $MgO + CaO + SrO + BaO$ | 1-4 |
| $ZnO$ | 0-4 |
| $TiO_2$ | 0-4 |
| $ZrO_2$ | 0-5 |
| $TiO_2 + ZrO_2 + SnO_2$ | 2-6 |
| $P_2O_5$ | 0-7 |
| F | 0-1 |
| $B_2O_3$ | 0-2 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

In particular, a material of the aforementioned composition may have a coefficient of thermal expansion between $4.5 \cdot 10^{-6} K^{-1}$ and $6 \cdot 10^{-6}$ $K^{-1}$ or between $4.76 \cdot 10^{-6}$ $K^{-1}$ and $5.7 \cdot 10^{-6} K^{-1}$.

More preferably, the lithium aluminosilicate glass has the following composition (in wt %):

| Composition | (wt %) |
| --- | --- |
| $SiO_2$ | 57-63 |
| $Al_2O_3$ | 18-22 |
| $Li_2O$ | 3.5-5 |
| $Na_2O + K_2O$ | 5-20 |
| $MgO + CaO + SrO + BaO$ | 0-5 |
| $ZnO$ | 0-3 |
| $TiO_2$ | 0-3 |
| $ZrO_2$ | 0-5 |
| $TiO_2 + ZrO_2 + SnO_2$ | 2-5 |
| $P_2O_5$ | 0-5 |
| F | 0-1 |
| $B_2O_3$ | 0-2 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

In particular, a material of the aforementioned composition may have a coefficient of thermal expansion between $4 \cdot 10^{-6}$ $K^{-1}$ and $8 \cdot 10^{-6} K^{-1}$ or between $5 \cdot 10^{-6} K^{-1}$ and $7 \cdot 10^{-6}$ $K^{-1}$. Also, a corresponding glass ceramic may be provided having a coefficient of thermal expansion between $-0.068 \cdot 10^{-6} K^{-1}$ and $1.16 \cdot 10^{-6}$ $K^{-1}$.

According to a further example, the substrate may be a soda-lime glass of the following composition (in wt %):

| Composition | (wt %) |
| --- | --- |
| $SiO_2$ | 40-81 |
| $Al_2O_3$ | 0-6 |
| $B_2O_3$ | 0-5 |
| $Li_2O + Na_2O + K_2O$ | 5-30 |
| $MgO + CaO + SrO + BaO + ZnO$ | 5-30 |
| $TiO_2 + ZrO_2$ | 0-7 |
| $P_2O_5$ | 0-2 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

In particular, a material of the aforementioned composition may have a coefficient of thermal expansion between $5.25 \cdot 10^{-6}$ $K^{-1}$ and $10 \cdot 10^{-6}$ $K^{-1}$ or between $5.53 \cdot 10^{-6}$ $K^{-1}$ and $9.77 \cdot 10^{-6}$ $K^{-1}$.

Preferably, the soda-lime glass has the following composition (in wt %):

| Composition | (wt %) |
| --- | --- |
| $SiO_2$ | 50-81 |
| $Al_2O_3$ | 0-5 |
| $B_2O_3$ | 0-5 |
| $Li_2O + Na_2O + K_2O$ | 5-28 |
| $MgO + CaO + SrO + BaO + ZnO$ | 5-25 |

-continued

| Composition | (wt %) |
|---|---|
| $TiO_2 + ZrO_2$ | 0-6 |
| $P_2O_5$ | 0-2 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, $Cl$, $F$, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

In particular, a material of the aforementioned composition may have a coefficient of thermal expansion between $4.5 \cdot 10^{-6} K^{-1}$ and $11 \cdot 10^{-6} K^{-1}$ or between $4.94 \cdot 10^{-6} K^{-1}$ and $10.25 \cdot 10^{-6} K^{-1}$.

More preferably, the soda-lime glass has the following composition (in wt %):

| Composition | (wt %) |
|---|---|
| $SiO_2$ | 55-76 |
| $Al_2O_3$ | 0-5 |
| $B_2O_3$ | 0-5 |
| $Li_2O + Na_2O + K_2O$ | 5-25 |
| $MgO + CaO + SrO + BaO + ZnO$ | 5-20 |
| $TiO_2 + ZrO_2$ | 0-5 |
| $P_2O_5$ | 0-2 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, $Cl$, $F$, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

In particular, a material of the aforementioned composition may have a coefficient of thermal expansion between $4.5 \cdot 10^{-6} K^{-1}$ and $11 \cdot 10^{-6} K^{-1}$ or between $4.93 \cdot 10^{-6} K^{-1}$ and $10.25 \cdot 10^{-6} K^{-1}$.

According to a further example, the substrate is a borosilicate glass of the following composition (in wt %):

| Composition | (wt %) |
|---|---|
| $SiO_2$ | 60-85 |
| $Al_2O_3$ | 0-10 |
| $B_2O_3$ | 5-20 |
| $Li_2O + Na_2O + K_2O$ | 2-16 |
| $MgO + CaO + SrO + BaO + ZnO$ | 0-15 |
| $TiO_2 + ZrO_2$ | 0-5 |
| $P_2O_5$ | 0-2 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, $Cl$, $F$, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

In particular, a material of the aforementioned composition may have a coefficient of thermal expansion between $2.75 \cdot 10^{-6} K^{-1}$ and $10 \cdot 10^{-6} K^{-1}$ or between $3.0 \cdot 10^{-6} K^{-1}$ and $9.01 \cdot 10^{-6} K^{-1}$.

More preferably, the borosilicate glass has the following composition (in wt %):

| Composition | (wt %) |
|---|---|
| $SiO_2$ | 63-84 |
| $Al_2O_3$ | 0-8 |
| $B_2O_3$ | 5-18 |
| $Li_2O + Na_2O + K_2O$ | 3-14 |
| $MgO + CaO + SrO + BaO + ZnO$ | 0-12 |
| $TiO_2 + ZrO_2$ | 0-4 |
| $P_2O_5$ | 0-2 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, $Cl$, $F$, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

In particular, a material of the aforementioned composition may have a coefficient of thermal expansion between $2.5 \cdot 10^{-6} K^{-1}$ and $8 \cdot 10^{-6} K^{-1}$ or between $2.8 \cdot 10^{-6} K^{-1}$ and $7.5 \cdot 10^{-6} K^{-1}$.

Even more preferably, the borosilicate glass has the following composition (in wt %):

| Composition | (wt %) |
|---|---|
| $SiO_2$ | 63-83 |
| $Al_2O_3$ | 0-7 |
| $B_2O_3$ | 5-18 |
| $Li_2O + Na_2O + K_2O$ | 4-14 |
| $MgO + CaO + SrO + BaO + ZnO$ | 0-10 |
| $TiO_2 + ZrO_2$ | 0-3 |
| $P_2O_5$ | 0-2 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, $Cl$, $F$, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

In particular, a material of the aforementioned composition may have a coefficient of thermal expansion between $3.0 \cdot 10^{-6} K^{-1}$ and $8 \cdot 10^{-6} K^{-1}$ or between $3.18 \cdot 10^{-6} K^{-1}$ and $7.5 \cdot 10^{-6} K^{-1}$.

According to a further example, the substrate is an alkali metal aluminosilicate glass of the following composition (in wt %):

| Composition | (wt %) |
|---|---|
| $SiO_2$ | 40-75 |
| $Al_2O_3$ | 10-30 |
| $B_2O_3$ | 0-20 |
| $Li_2O + Na_2O + K_2O$ | 4-30 |
| $MgO + CaO + SrO + BaO + ZnO$ | 0-15 |
| $TiO_2 + ZrO_2$ | 0-15 |
| $P_2O_5$ | 0-10 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, $Cl$, $F$, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

In particular, a material of the aforementioned composition may have a coefficient of thermal expansion between $3.0 \cdot 10^{-6}$ $K^{-1}$ and $11 \cdot 10^{-6}$ $K^{-1}$ or between $3.3 \cdot 10^{-6}$ $K^{-1}$ and $10 \cdot 10^{-6}$ $K^{-1}$.

More preferably, the alkali metal aluminosilicate glass has the following composition (in wt %):

| Composition | (wt %) |
| --- | --- |
| $SiO_2$ | 50-70 |
| $Al_2O_3$ | 10-27 |
| $B_2O_3$ | 0-18 |
| $Li_2O + Na_2O + K_2O$ | 5-28 |
| $MgO + CaO + SrO + BaO + ZnO$ | 0-13 |
| $TiO_2 + ZrO_2$ | 0-13 |
| $P_2O_5$ | 0-9 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

In particular, a material of the aforementioned composition may have a coefficient of thermal expansion between $3.75 \cdot 10^{-6}$ $K^{-1}$ and $11 \cdot 10^{-6}$ $K^{-1}$ or between $3.99 \cdot 10^{-6}$ $K^{-1}$ and $10.22 \cdot 10^{-6}$ $K^{-1}$.

Yet more preferably, the alkali aluminosilicate glass has the following composition (in wt %):

| Composition | (wt %) |
| --- | --- |
| $SiO_2$ | 55-68 |
| $Al_2O_3$ | 10-27 |
| $B_2O_3$ | 0-15 |
| $Li_2O + Na_2O + K_2O$ | 4-27 |
| $MgO + CaO + SrO + BaO + ZnO$ | 0-12 |
| $TiO_2 + ZrO_2$ | 0-10 |
| $P_2O_5$ | 0-8 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

In particular, a material of the aforementioned composition may have a coefficient of thermal expansion between $4.0 \cdot 10^{-6}$ $K^{-1}$ and $10 \cdot 10^{-6}$ $K^{-1}$ or between $4.5 \cdot 10^{-6}$ $K^{-1}$ and $9.08 \cdot 10^{-6}$ $K^{-1}$.

According to a further example, the substrate is a low alkali aluminosilicate glass of the following composition (in wt %):

| Composition | (wt %) |
| --- | --- |
| $SiO_2$ | 50-75 |
| $Al_2O_3$ | 7-25 |

-continued

| Composition | (wt %) |
| --- | --- |
| $B_2O_3$ | 0-20 |
| $Li_2O + Na_2O + K_2O$ | 0-4 |
| $MgO + CaO + SrO + BaO + ZnO$ | 5-25 |
| $TiO_2 + ZrO_2$ | 0-10 |
| $P_2O_5$ | 0-5 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

In particular, a material of the aforementioned composition may have a coefficient of thermal expansion between $2.5 \cdot 10^{-6} K^{-1}$ and $7 \cdot 10^{-6}$ $K^{-1}$ or between $2.8 \cdot 10^{-6}$ $K^{-1}$ and $6.5 \cdot 10^{-6}$ $K^{-1}$.

More preferably, the low alkali aluminosilicate glass has the following composition (in wt %):

| Composition | (wt %) |
| --- | --- |
| $SiO_2$ | 52-73 |
| $Al_2O_3$ | 7-23 |
| $B_2O_3$ | 0-18 |
| $Li_2O + Na_2O + K_2O$ | 0-4 |
| $MgO + CaO + SrO + BaO + ZnO$ | 5-23 |
| $TiO_2 + ZrO_2$ | 0-10 |
| $P_2O_5$ | 0-5 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

In particular, a material of the aforementioned composition may have a coefficient of thermal expansion between $2.5 \cdot 10^{-6} K^{-1}$ and $7 \cdot 10^{-6}$ $K^{-1}$ or between $2.8 \cdot 10^{-6}$ $K^{-1}$ and $6.5 \cdot 10^{-6}$ $K^{-1}$.

Even more preferably, the low alkali aluminosilicate glass has the following composition (in wt %):

| Composition | (wt %) |
| --- | --- |
| $SiO_2$ | 53-71 |
| $Al_2O_3$ | 7-22 |
| $B_2O_3$ | 0-18 |
| $Li_2O + Na_2O + K_2O$ | 0-4 |
| $MgO + CaO + SrO + BaO + ZnO$ | 5-22 |
| $TiO_2 + ZrO_2$ | 0-8 |
| $P_2O_5$ | 0-5 |

Optionally, coloring oxides may be added, such as $Nd_2O_3$, $Fe_2O_3$, $CoO$, $NiO$, $V_2O_5$, $MnO_2$, $TiO_2$, $CuO$, $CeO_2$, $Cr_2O_3$, from 0 to 2 wt % of $As_2O_3$, $Sb_2O_3$, $SnO_2$, $SO_3$, Cl, F, and/or $CeO_2$ may be added as a refining agent, and from 0 to 5 wt % of rare earth oxides may further be added to impart magnetic, photonic or optical functions to the glass layer or glass sheet, and the total amount of the total composition is 100 wt %.

In particular, a material of the aforementioned composition may have a coefficient of thermal expansion between $2.5 \cdot 10^{-6} \text{K}^{-1}$ and $7 \cdot 10^{-6} \text{K}^{-1}$ or between $2.8 \cdot 10^{-6} \text{K}^{-1}$ and $6.5 \cdot 10^{-6} \text{K}^{-1}$.

The substrate may also have a thickness of less than 350 μm, preferably less than 250 μm, more preferably less than 100 μm, most preferably less than 50 μm, and preferably of at least 3 μm, more preferably at least 10 μm, most preferably at least 15 μm. Preferred thicknesses of the substrate are 5, 10, 15, 25, 30, 35, 50, 55, 70, 80, 100, 130, 145, 160, 190, 210, or 280 μm. The substrate may in particular be provided in the form of a thin glass ribbon or glass film.

So, more generally, the invention relates to a method for separating a substrate, in particular a substrate made of brittle-hard material, especially glass, glass ceramics, and/or silicon, which comprises the following method steps:

(a) providing at least one sheet-like substrate, in particular a glass element, a glass ceramic element or a silicon element, which has at least one known material parameter, in particular one of the coefficient of thermal expansion, Young's modulus, and/or glass transition temperature, and/or at least one known substrate property, in particular transmittance, e.g. for the laser light, and/or average roughness $R_a$ of at least one of the substrate surfaces;

(b) defining at least one process parameter, in particular a spacing of defects, a number of laser pulses, and/or a burst frequency, as a function of the at least one known material parameter and/or the at least one known substrate property; and (c) introducing defects into the substrate at a spacing from one another along a predetermined separation line using laser pulses of a laser according to the at least one predetermined process parameter.

It may preferably be contemplated that the substrate has a transmittance, in particular for the pulsed laser beam, of more than 70%, preferably more than 80%, most preferably more than 85%. Furthermore, average roughness $R_a$ is preferably less than 0.5 μm, more preferably less than 0.4 μm, most preferably less than 0.35 μm.

The invention also relates to a workpiece, in particular a glass product, a glass ceramic product or a silicon product which is pre-damaged along a separation line in a manner so that the workpiece has defects at a spacing from one another along the separation line, wherein the breaking stress $\sigma_B$ for separating the workpiece along the separation line is smaller than a first reference stress $\sigma_{R1}$ that depends on the respective workpiece, and wherein the edge strength $\sigma_K$ of the separation edge obtained after the separation is greater than a second reference stress $\sigma_{R2}$ that depends on the respective workpiece.

Both the first and second reference stresses may be given as a maximum thermal stress that depends on the material of the workpiece $\sigma_{R1} = \sigma_{R2} = \sigma_{th}$, and the maximum thermal stress $\sigma_{th}$ may in particular be determined according to the formula $\sigma_{th} = 0.5 \cdot \alpha \cdot E \cdot (T_g - 100^\circ \text{ C.})$.

In a preferred embodiment, $\sigma_{R1} \leq C_{R1} \cdot \alpha \cdot E \cdot (T_g - 100^\circ \text{ C.})$ may apply to the first reference stress, and $\sigma_{R2} \geq C_{R2} \cdot \alpha \cdot E \cdot (T_g - 100^\circ \text{ C.})$ may apply to the second reference stress, wherein $C_{R1}$ and $C_{R2}$ are reference stress coefficients, with $C_{R1} = 0.5/k$ and $C_{R2} = 0.5 \cdot k$, and with k=1.5, preferably k=2, more preferably k=2.5.

The workpieces described above have preferably not been toughened. However, a toughened workpiece may be provided as well, in particular a workpiece made of glass, in which case the first and the second reference stresses are identical and are given as an inner tensile stress $\sigma_{CT}$ defined by the properties of the toughened workpiece, i.e. $\sigma_{R1} = \sigma_{R2} = \sigma_{CT}$. The workpiece may in particular be chemically toughened, in which case the inner tensile stress $\sigma_{CT}$ can be determined according to the formula $\sigma_{CT} = (\sigma_{CS} \cdot d_L)/(d - 2d_L)$. The workpiece may as well be toughened thermally, in which case the inner tensile stress $\sigma_{CT}$ can be determined according to the formula $\sigma_{CT} = \sigma_{CS}/2$.

DESCRIPTION OF THE DRAWINGS

Reference will now be made to the accompanying figures. In the figures, the same reference numerals designate the same or equivalent elements, wherein.

DETAILED DESCRIPTION

Figure 1:
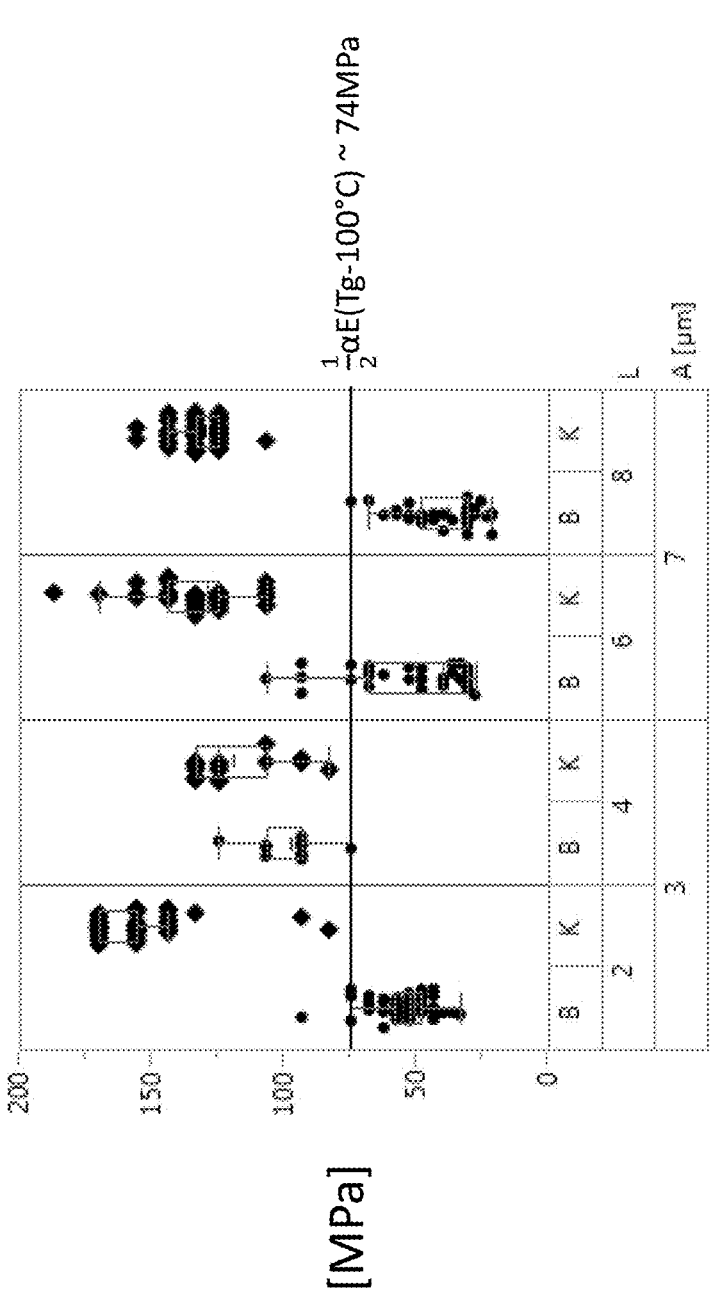
FIG. 1 shows test results of breaking stress $\sigma_B$ and edge strength $\sigma_K$, in MPa, for SCHOTT AF32® glass having defects along a separation line, for different spacings A between neighboring defects and for different numbers L of laser pulses for generating a respective defect.
Figure 2:
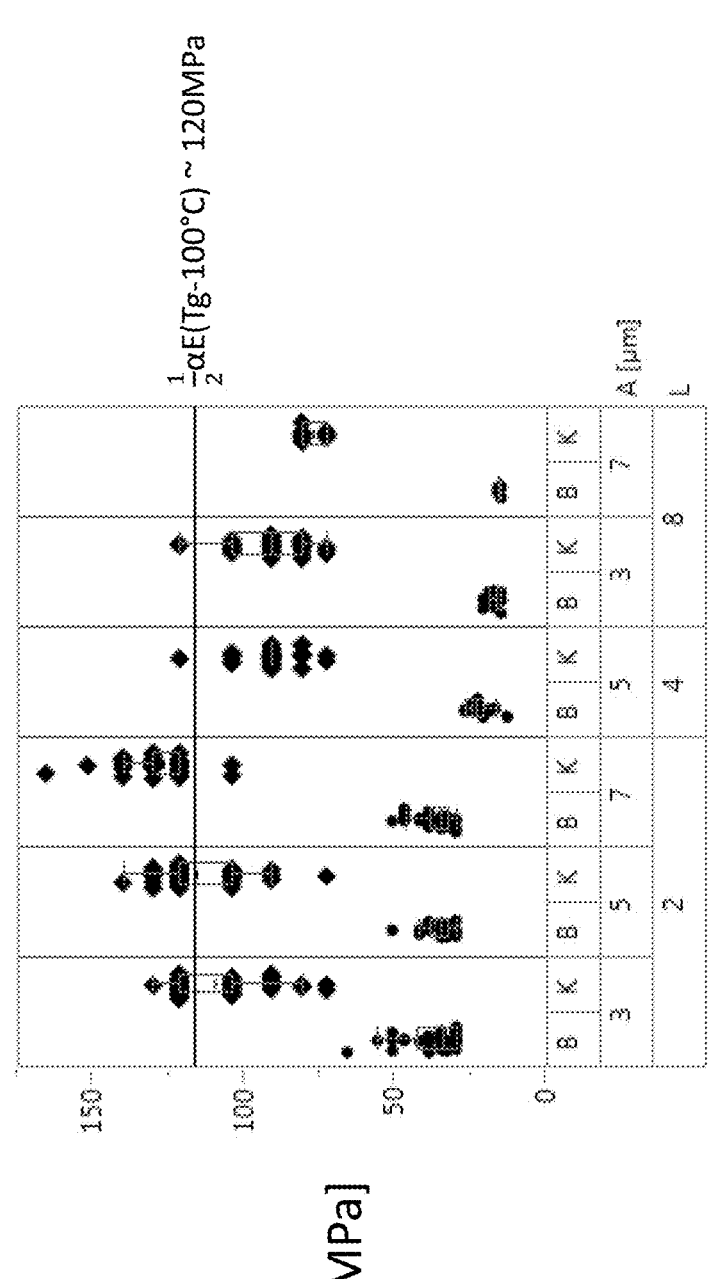
FIG. 2 shows test results of breaking stress $\sigma_B$ and edge strength $\sigma_K$, in MPa, for SCHOTT D263® glass having defects along a separation line, for different spacings A between neighboring defects and for different numbers L of laser pulses for generating a respective defect.
Figure 3:
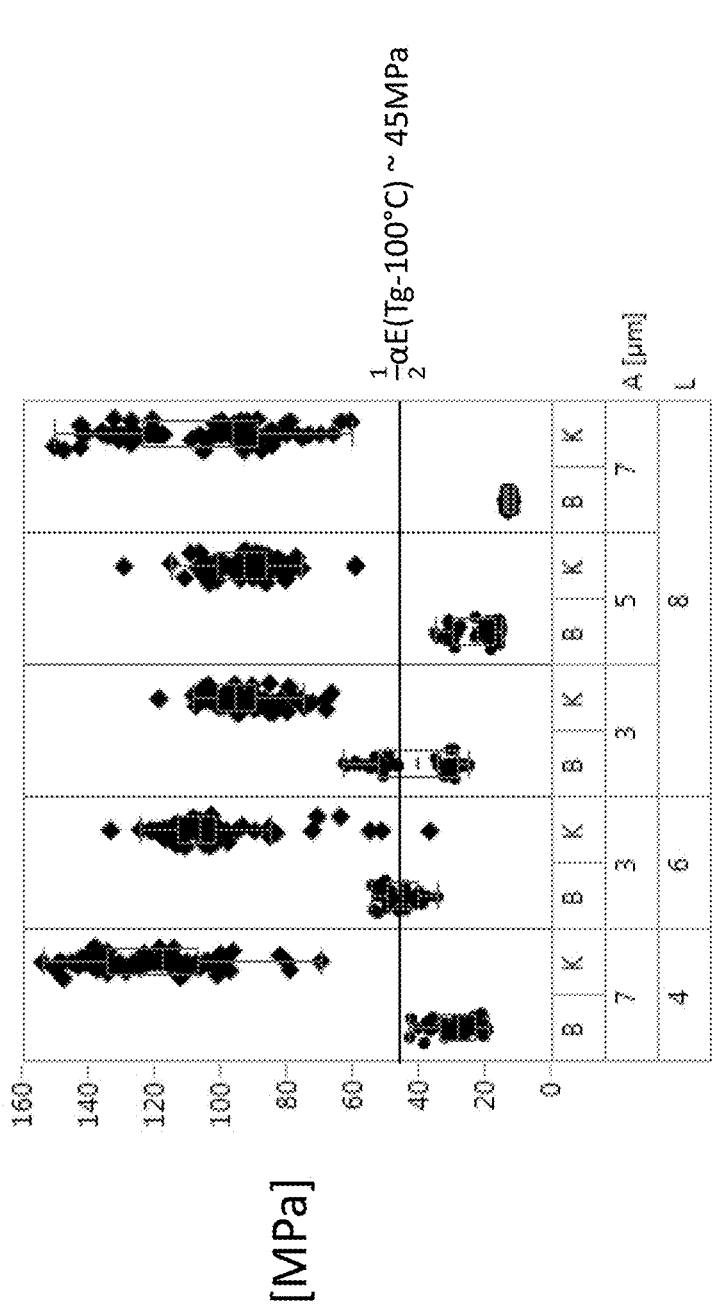
FIG. 3 shows test results of breaking stress $\sigma_B$ and edge strength $\sigma_K$, in MPa, for SCHOTT BOROFLOAT® 33 glass having defects along a separation line, for different spacings A between neighboring defects and for different numbers L of laser pulses for generating a respective defect.

Referring to FIGS. 1 to 3, the results of a DOE series of tests are shown for three different glasses, namely SCHOTT AF32® (FIG. 1), SCHOTT D263® (FIG. 2), and SCHOTT BOROFLOAT® 33 (FIG. 3).

This represents a selection of examples. More generally, the invention can be used for various substrates, in particular made of glass, glass ceramics, and/or silicon with filamentation, in particular even for materials having a low coefficient of thermal expansion.

Filamentation was performed for each of a plurality of samples of these glasses, i.e. spaced apart defects were introduced into the volume of the respective sample along a separation line by laser pulses of a laser.

For the samples made of SCHOTT AF32® or SCHOTT D263®, substrate thicknesses of approximately 100 μm were in particular selected, and for the samples made of SCHOTT BOROFLOAT® 33, substrate thicknesses of approximately 1 mm were in particular selected.

After filamentation, the breaking strength $\sigma_B$ of the glass with respect to the filamented separation line was tested in each case. In other words, the samples were separated along the separation line, and the breakage stress required for separation was measured and logged. Depending on the thickness of the material, either the 4-point bending strength test method according to DIN EN 843-1 (thicker glasses) was performed, or the breaking strength was determined according to DE 10 2014 110 855 A1 (thinner glasses) with a step roller. DE 10 2014 110 855 A1 describes a method and a device for determining the breaking strength of the edges of thin ribbons of brittle material.

In a next step, the separation edge obtained after separation was tested for its strength in each of the samples. In order to determine the respective edge strength $\sigma_K$, the samples were again tested either by the method according to DIN EN 843-1 (thicker glasses) or according to DE 10 2014 110 855 A1 (thinner glasses), depending on the thickness of the material, and the measured results were logged.

The breaking stresses $\sigma_B$ and edge strengths $\sigma_K$ obtained in this way are plotted on the ordinate axis, in units of MPa, in FIGS. 1 to 3. The breaking stresses $\sigma_B$ are indicated by B and the edge strengths $\sigma_K$ are accordingly indicated by K at the bottom of the diagram.

Furthermore, the laser filamentation was performed with different parameters, i.e. different perforated samples were produced. The spacing between neighboring defects was varied, as well as the numbers of laser pulses for producing a respective defect. These parameters were set for a sample and were kept constant during the filamentation of a particular sample in each case.

Accordingly, FIGS. 1 to 3 show the breaking stresses $\sigma_K$ and edge strengths K for the different parameters of laser filamentation, which are plotted on the abscissa axis. Here, the spacing between neighboring defects, in micrometers, is denoted by A, and the number of laser pulses for generating a respective defect is denoted by L.

Based on the experimental results presented, it can be verified that it is particularly favorable for a cleaving step following the filamentation, to set the filamentation process parameters A and L with regard to the breaking stress σK for separation along the separation line and with regard to the edge strength $\sigma_K$ of the separation edge obtained after separation.

What can be verified below, in particular, is the finding that it has proved to be particularly favorable to set the breaking stress $\sigma_K$ for separating the glass along the separation line so as to be smaller than a first reference stress $\sigma_{R1}$ that depends on the respective glass, and the edge strength $\sigma_K$ after separation so as to be greater than a second reference stress $\sigma_{R2}$ that depends on the respective glass. For example, it has been found to be particularly advantageous if $\sigma_{R1}=\sigma_{R2}=\sigma_{th}$ holds, wherein $\sigma_{th}$ is the maximum thermal stress which can be assumed as $\sigma_{th}=0.5\cdot\alpha\cdot E\cdot(T_g-100°\ C.)$, for example.

In FIGS. 1 to 3, the maximum thermal stress $0.5\cdot\alpha\cdot E\cdot(T_g-100°\ C.)$ so determined for the respective glass has been calculated and is plotted as a horizontal line.

It turns out that for all three glasses, i.e. SCHOTT AF32® (FIG. 1), SCHOTT D263® (FIG. 2), and SCHOTT BOROFLOAT® 33 (FIG. 3), this value is in the order of magnitude of the measured breaking stresses $\sigma_B$ and edge strengths $\sigma_K$, and that therefore the possibility arises to select the process parameters A and L in an optimized manner with regard to this value.

From the test results shown in FIG. 1, which relate to SCHOTT AF32® glass, it can be seen that in particular a defect spacing of 7 μm in combination with a number of 8 laser pulses is particularly suitable, in particular with respect to the value $0.5\cdot\alpha\cdot E\cdot(T_g-100°\ C.)$, in order to minimize the breaking stress $\sigma_B$ and on the other hand to maximize the edge strengths $\sigma_K$.

For SCHOTT glass D263®, it can be seen from FIG. 2 that a defect spacing of 7 μm in combination with a number of 2 laser pulses constitute particularly suitable parameters.

For SCHOTT glass BOROFLOAT® 33, it can be seen from FIG. 3 that either the combination of a number of 4 pulses and a defect spacing of 7 μm or the combination of a number of 8 pulses and a defect spacing of 5 μm or 7 μm are particularly suitable parameters.

So, by optimizing the filaments in terms of breaking stress, the subsequent separation process (cleaving step) by thermally induced stresses can be performed in an optimized manner.

The tests in particular show that, surprisingly, perforations at a larger spacing bring about advantages for separability, across the materials.

This includes higher process reliability: even with marginal process windows, i.e. processes with parameter ranges that could previously not be performed reliably according to the prior art, the substrates can be reliably separated with the method according to the invention.

Moreover, the laser can be operated at reduced power, and/or the displacement rate (advance rate) of the laser can be adjusted, in particular increased. For example, for materials with a perforation spacing of 5 μm and process setting with an advance rate of 40 mm/s, it was possible to reduce the laser power from 110 W to 75 W.

In one application example, a sample made of SCHOTT BOROFLOAT® 33 of 1 mm thickness, with a CTE of $3.3\cdot10^{-6}\ K^{-1}$, was filamented with a defect spacing of 7 μm and 6 laser pulses for producing a respective defect, at 300 kHz and with an advance rate of 2100 mm/s.

Another advantage arises with regard to the shaping of the separation edge. Due to lower stress during the cleaving step, more complex geometries can be produced, for example smaller corner radii.

Furthermore, the edge quality can be improved: chipping at the edge or microcracks are avoided or are not perceptible, neither visually nor microscopically. This has a positive effect in particular on edge strength.

Figure 4:
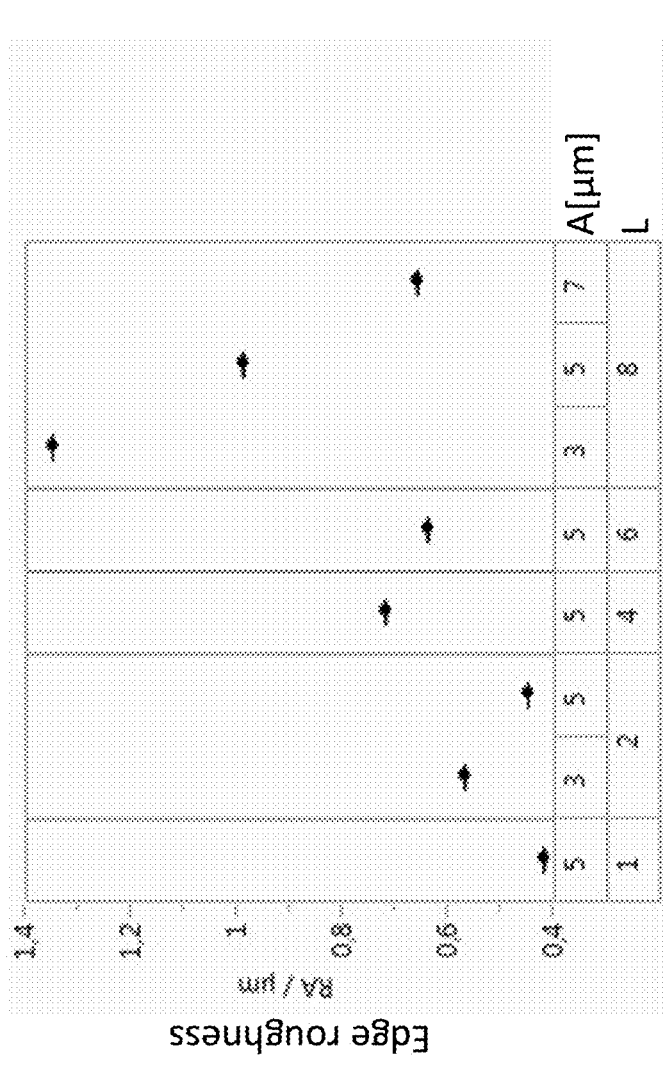
FIG. 4 shows test results of the edge roughness, in MPa, for SCHOTT BOROFLOAT® 33 glass having defects along a separation line, for different spacings A between neighboring defects and for different numbers L of laser pulses for generating a respective defect.

By way of example, FIG. 4 shows the edge roughness for SCHOTT BOROFLOAT® 33 of 1 mm thickness for various process parameters. The number of laser pulses L is denoted by burst in this figure. It can be seen that with the same number of laser pulses, the edge roughness decreases with increasing spacing of the defects.

In the following tables, properties of the aforementioned Schott glasses AF32®, D263®, and BOROFLOAT® 33 are listed in detail.

TABLE 1

Properties of SCHOTT AF32 ®:
Technical Data:

| Dimensions: | round and square custom size wafer formats, e.g. 6", 8", or 12" |
|---|---|
| Surface roughness | <1 nm RMS |
| Thicknesses | 0.03 mm up to 1.1 mm |
| Standard Thicknesses | 0.3 mm, 0.4 mm |

TABLE 1-continued

Properties of SCHOTT AF32 ®:
Technical Data:

| | |
|---|---|
| Luminous transmittance $\tau_{n065}$ (d = 0.5 mm) | 91.9% |
| Coefficient of mean linear thermal expansion $\alpha$ | $3.2 \cdot 10^{-4}$ K$^{-1}$ |
| (20° C.; 300° C.) (static measurement) | |
| Transformation temperature $T_g$ | 717° C. |
| Dielectric constant $\varepsilon_r$ at 1 MHz | 5.1 |
| Refractive index $n_D$ | 1.5099 |
| Density $\rho$ (annealed at 40° C./h) | 2.43 g/cm$^3$ |

The Young's modulus of SCHOTT AF32® is estimated to be 74.8 kN/mm$^2$.

TABLE 2

Properties of SCHOTT glass D263 ®:
Technical Data

| | |
|---|---|
| Dimensions | 440 mm × 360 mm, other size on request |
| Surface roughness | <1 nm RMS |
| Thicknesses | 0.03 mm up to 1.1 mm |
| Standard thicknesses and packaging units | 0.21 mm 100 pcs |
| | 0.30 mm 100 pcs |
| | 0.40 mm 50 pcs |
| | 0.55 mm 50 pcs |
| Luminous transmittance $\tau_{n065}$ (d = 0.5 mm) | 91.7% |
| Coefficient of mean linear thermal expansion $\alpha$ | $7.2 \cdot 10^{-4}$ K$^{-1}$ |
| (20° C.; 300° C.) (static measurement) | |
| Transformation temperature $T_g$ | 557° C. |
| Dielectric constant $\varepsilon_r$ at 1 MHz | 6.7 |
| Refractive index $n_D$ | 1.5230 |
| Density $\rho$ (annealed at 40° C./h) | 2.51 g/cm$^3$ |

The Young's modulus of SCHOTT D263® is estimated to be 72.9 kN/mm$^2$.

TABLE 3

Properties of SCHOTT BOROFLOAT ® 33:

| | | | |
|---|---|---|---|
| Coefficient of linear thermal expansion (C.T.E.) | $\alpha_{(20/300° C.)}$ | $3.25 \times 10^{-6}$ K$^{-1}$ (to ISO 7991) | |
| Specific heat capacity | $c_{(20/100° C.)}$ | $0.83$ KJ × (kg × K)$^{-1}$ | |
| Thermal conductivity | $\lambda_{(90° C.)}$ | $1.2$ W × (m × K)$^{-1}$ | |
| Viscosity $\eta$ | | | |
| Working point | $10^4$ | dPa · s | 1270° C. |
| Softening Point | $10^{7.6}$ | dPa · s | 820° C. |
| Annealing Point | $10^{13}$ | dPa · s | 560° C. |
| Strain Point | $10^{14.5}$ | dPa · s | 518° C. |
| Transformation temperature ($T_g$) | | | 525° C. |

The Young's modulus of SCHOTT BOROFLOAT® 33 is estimated to be 64 kN/mm$^2$.

The problem that a crack does not follow a predetermined separation line during the severing and runs away, or that the crack does not start or that it stops is aggravated when crossing separation lines are provided. When separating substrates that have separation lines arranged at angles to one another and consist of filaments, by thermally induced stress, the problem often arising at the crossing points of the separation lines is that the cracking runs in potentially all directions. If the separation lines are used as a preparation for breaking in the context of a multi-step process (e.g. with intermediate steps of washing, coating, etc.) for being separated or singulated into multiple portions later, the pre-processed substrate often has initial cracks at the crossing points of the separation lines. In this case, the separation lines that are to be separated later (for example after further process steps such as washing and coating), are also subject to initial crack formation. This increases the risk that the separation line will break in a non-controlled manner during the further processing.

Even in this case, due to the precisely set breaking stress, the invention is generally particularly suitable for enabling separation along an intended line, even if the latter is crossed by a further separation line of spaced-apart defects. According to one embodiment of the invention it is therefore contemplated that the workpiece according to the invention has at least two crossing separation lines of spaced-apart defects, or that at least two crossing separation lines with spaced-apart defects are generated in the substrate.

In the case of crossing separation lines it is advantageous to provide the workpiece with different separation lines that can be separated by different stress levels.

More generally, without being limited to specific exemplary embodiments, a workpiece is provided according to a further aspect of the invention, in particular a glass product, a glass ceramic product, and/or a silicon product, which is pre-damaged along at least two crossing separation lines, so that the workpiece can be separated by applying a breaking stress along the separation lines, and wherein the breaking stresses for severing along the separation or modification lines differ by at least 3 MPa, preferably by at least 5 MPa, more preferably by at least 10 MPa.

It is particularly advantageous in this case, if the main structure of those separation lines that are to be separated first have a significantly lower stress than the separation lines which are to be separated later.

More generally, it is preferred that the workpiece again has defects that are spaced apart along the separation lines, and that the breaking stress $\sigma_B$ for separating the workpiece along the separation line is smaller than a first reference stress $\sigma_{R1}$ that depends on the respective workpiece, and that the edge strength $\sigma_K$ of the separation edge obtained after the separation is greater than a second reference stress $\sigma_{R2}$ that depends on the respective workpiece. Accordingly, the breaking stress of the other separation line will then be higher or lower by at least 3 MPa. Most preferably, this second breaking stress is higher.

The different breaking stresses may preferably be set by changing the laser parameters such that all of the features described herein for the separation lines produced by the ultra-short pulsed laser also apply to this embodiment with crossing separation lines. However, it is also conceivable to produce defects along the crossing separation lines in other ways. So, this embodiment of the invention is therefore not necessarily limited to the introduction of filamentary defects or to the laser processing.

Figures 5, 6:
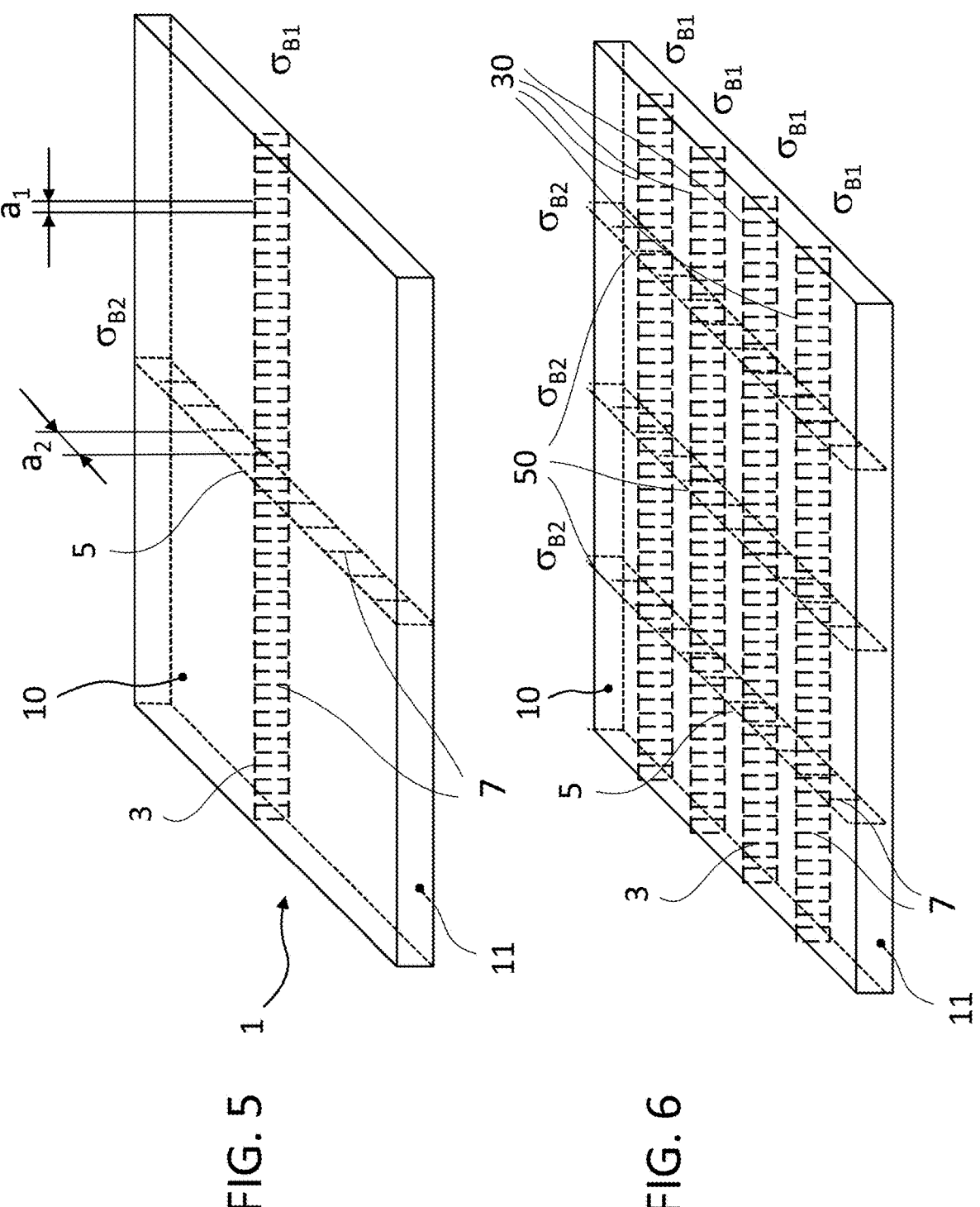
FIG. 5 shows a workpiece with two separation lines crossing each other.
FIG. 6 shows a workpiece with two sets of crossing separation lines.

FIG. 5 shows a workpiece or substrate 1 which has two separation lines 3, 5, as described above. Preferably, the substrate 1 generally has a sheet-like shape and accordingly has two opposite generally parallel faces 10, 11, without being limited to the illustrated example. With the described method, filamentary defects 7 were introduced into the substrate 1 using an ultrashort pulsed laser. For this purpose, the laser light is irradiated onto one of the faces 10, 11, so that the filamentary defects 7 extend between the two faces 10, 11, following the beam direction. In the illustrated example, the separation lines 3, 5 are crossing at right angles, as is preferred to separate rectangular portions.

As can be seen from FIG. 5, the spacings $a_1$, $a_2$ of the filamentary defects 7 along the separation lines 3, 5 are different. In the illustrated example, the spacing a1 of the filamentary defects along separation line 3 is smaller than the spacing $a_2$ of the filamentary defects along separation line 5. Thus, the breaking stress $\sigma_{B1}$ for severing along the separation line 3 is different from the breaking stress $\sigma_{B2}$ for severing along the separation line 5. According to the observations discussed above, with the smaller spacing $a_1$, the breaking stress for separation line 3 might be either higher or lower. Typically, a minimum of breaking stress is found for a spacing of the linear filaments in the range from 5 to 7 μm. More generally, without being limited to the illustrated example, a workpiece or substrate 1 is provided in which the spacing of the filamentary defects differ, wherein the spacing in one of the separation lines 3 is smaller than in the other one of the crossing separation lines.

According to a further embodiment, the workpiece or substrate 1 is distinguished by having at least two different separation lines, as shown in FIG. 5, and the breaking stress $\sigma_{B1}$ for separating the workpiece 1 along a separation line 3 is smaller than a first reference stress $\sigma_{R1}$ that depends on the respective workpiece, and the edge strength $\sigma_K$ of the separation edge obtained after the separation is greater than a second reference stress $\sigma_{R2}$ that depends on the respective workpiece, and the second separation line 5 has a significantly higher breaking stress of at least $\sigma_{B1}$+5 MPa, preferably $\sigma_{B1}$+10 MPa, most preferably $\sigma_{B1}$+15 MPa. Preferably, the second separation line is even formed such that the breaking stress associated therewith is greater than $\sigma_{R1}$.

In a further embodiment, the substrate is provided with a plurality of separation lines for subsequent separation, and separation lines running in the same direction are generated with the same laser process parameters and therefore have the same breaking stress, and breaking stresses only differ between separation lines running in different directions. In other words, more than two crossing separation lines are provided, and the number of separation lines can be divided into at least two sets of juxtaposed separation lines, and the average breaking force of the separation lines of one set differs from the average breaking force of another set by the aforementioned value of at least 3 MPa. An example of such a workpiece or substrate 1 is shown in FIG. 6. A plurality of separation lines 3 run parallel to one another and so are juxtaposed along the face 10. These separation lines 3 are crossed by separation lines 5 which likewise run parallel to one another. As in the example shown in FIG. 5, the separation lines 3, 5 cross each other at right angles. The set of parallel separation lines 3 forms a first set 30 of separation lines, the separation lines 5 running perpendicular thereto form another set 50. The sets 30, 50 are distinguished by comprising separation lines with filamentary defects 7 that have the same spacing to one another within a set, but a different spacing compared to a separation line of the other set. Therefore, the breaking stresses of the separation lines 3 of set 30 have a value $\sigma_{B1}$ which differs from the value $\sigma_{B2}$ of the separation lines 5 of the other set 50.

In principle, there are several ways to modify or set the breaking stress along a separation line. For example, the number of burst pulses used to form the filament can be varied (in the range from 1 to 100 pulses, preferably in the range from 2 to 20 pulses). Also, the pulse energy of the single pulse or burst pulse can also be varied in the range from 100 μJ to 1 mJ for single pulses, or from 400 μJ to 4 mJ for burst pulses. Furthermore, as shown in the figures, the spacing of the filaments 7 in the individual separation lines 3, 5 can be varied to assume different values in a range from 1μm to 25 μm, most preferably in a range from 2 μm to 20 μm, so that different values are resulting for the spacings $a_1$ and $a_2$.

For example, for an alkali boroaluminosilicate glass of 0.5 mm thickness, a system of separation lines with different breaking stresses can be produced by reducing the refractive power from 25 MPa to about 15 MPa by altering the burst energy from 300 μJ to 400 μJ (for a USP laser with a repetition rate of 100 kHz and pulse duration of 10 ps). Furthermore, an increase in the pitch spacing results in a decrease in the breaking stress that is required for the separation process by about 5 MPa: with a pitch of 5 μm between the introduced modifications, a breaking stress of about 45 MPa is resulting for a glass as described above, whereas the breaking stress will only be 15 MPa in the case of a spacing of 10 μm.

Figure 7:
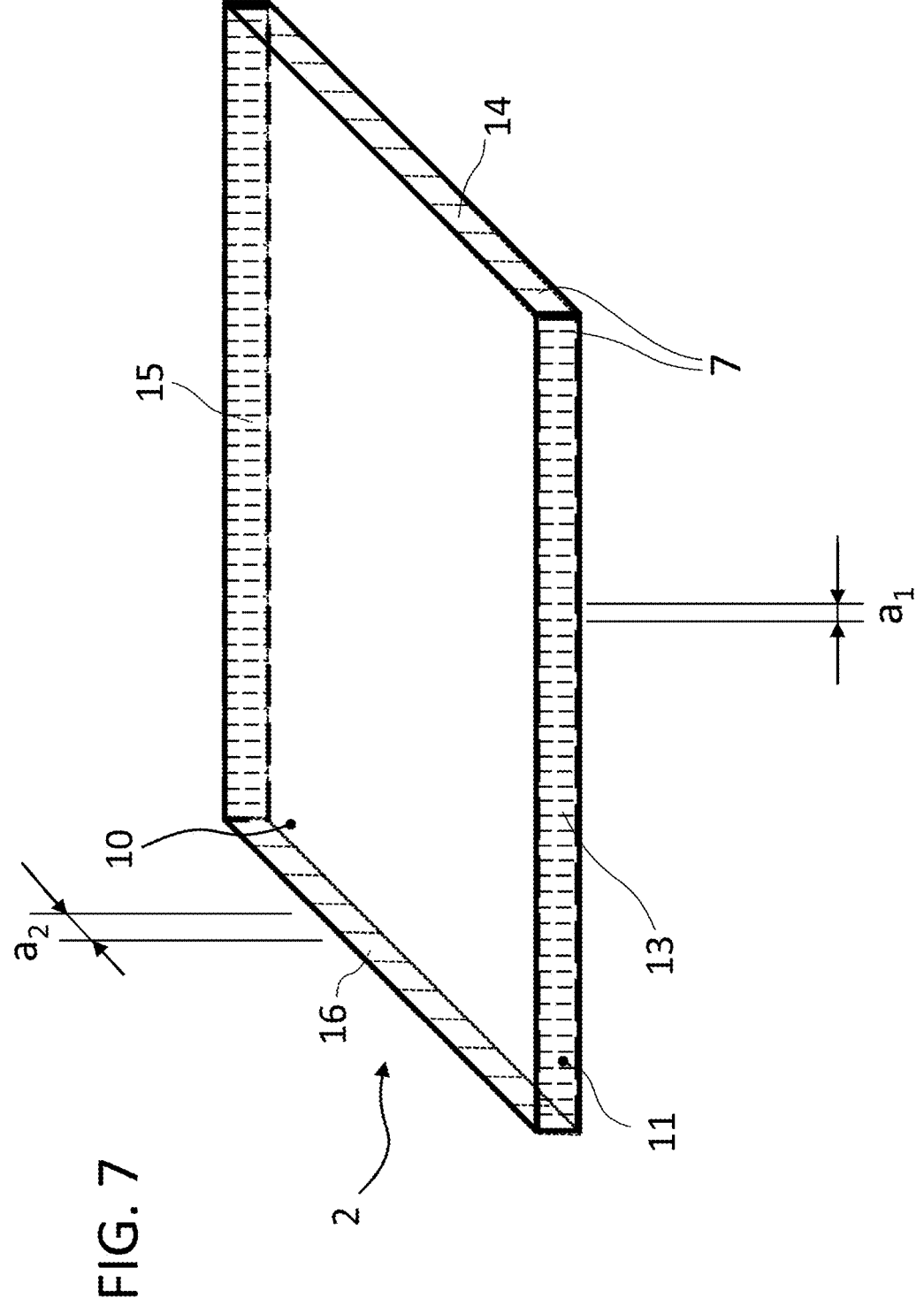
FIG. 7 shows an element separated out of a workpiece.

Once the separation lines have been introduced, the substrate 1 can be separated by a two-step singulation process, first by breaking along the first direction, then by breaking along the second direction. In this case, the adjacent edges of the portions will exhibit periodic patterns with a different spacing (as the filament channels open into two cylindrical halves) which are accessible to common topological measurement techniques such as tactile or optical profilometry or electron microscopy. Such an element 2 that has been separated from the workpiece 1 is shown in FIG. 7.

As can be seen from the schematic view, a sheet-like glass element or glass ceramic element 2 is provided, which has two opposite faces 10, 11 and edge surfaces 13, 14, 15, 16, wherein at least two of the edge surfaces 13, 14, 15, 16 exhibit filamentary defects 7 that extend side by side along the edge surface, with a periodic spacing and in the direction from one of the faces 10, 11 to the other one of the faces, and the period of the spacing of the filamentary defects is different for at least two of the edge surfaces 13, 14, 15, 16.

As in the illustrated example, a generally quadrangular shape is preferred, so that the element 2 will have two pairs of opposite edge surfaces 13, 15 and 14, 16. In this case, the period of the filamentary defects 7 is preferably the same for a pair of opposite edges. All information disclosed herein with regard to the method of the invention and the workpiece that can be produced thereby apply accordingly with regard to the period or spacing between the filamentary defects, the thickness of the element 2 and the material thereof.

Without restricting generality, the separation may be performed either by a mechanical breaking process or by a laser-based thermal separation process (using a $CO_2$ laser) or by other methods.

Figure 8:
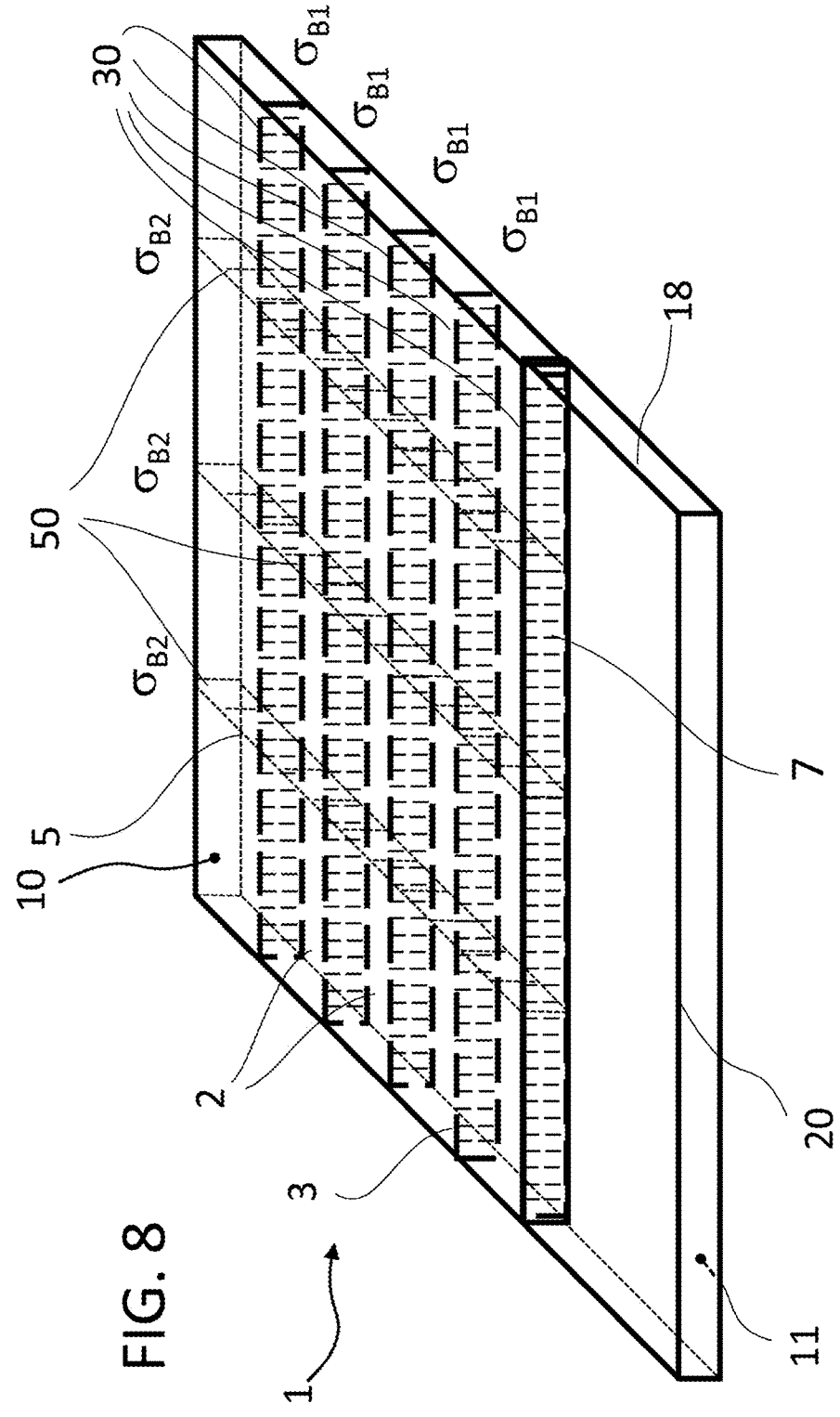
FIG. 8 shows a variation of the exemplary embodiment of FIG. 6, with a web for holding together the strip-wise separated workpiece.

In a further embodiment, the individual strips (formed by opposite edges of the same breaking stress) remain connected to one another through a common web that can be used as a handling aid for subsequent process steps such as washing, coating, and later singulation. An exemplary embodiment of such a workpiece 1 is shown in FIG. 8. As can be seen from the exemplary figure, the separation lines 5 of one of the sets, 50, terminate at a distance from one of the edges of the workpiece 1, so that a web 18 is formed between the ends of the separation lines 5 and the edge 20 of the workpiece, to which the separable elements 2 remain attached even when the workpiece 1 is severed along the separation lines 5 that terminate at a distance from the edge 20.

Figure 9:
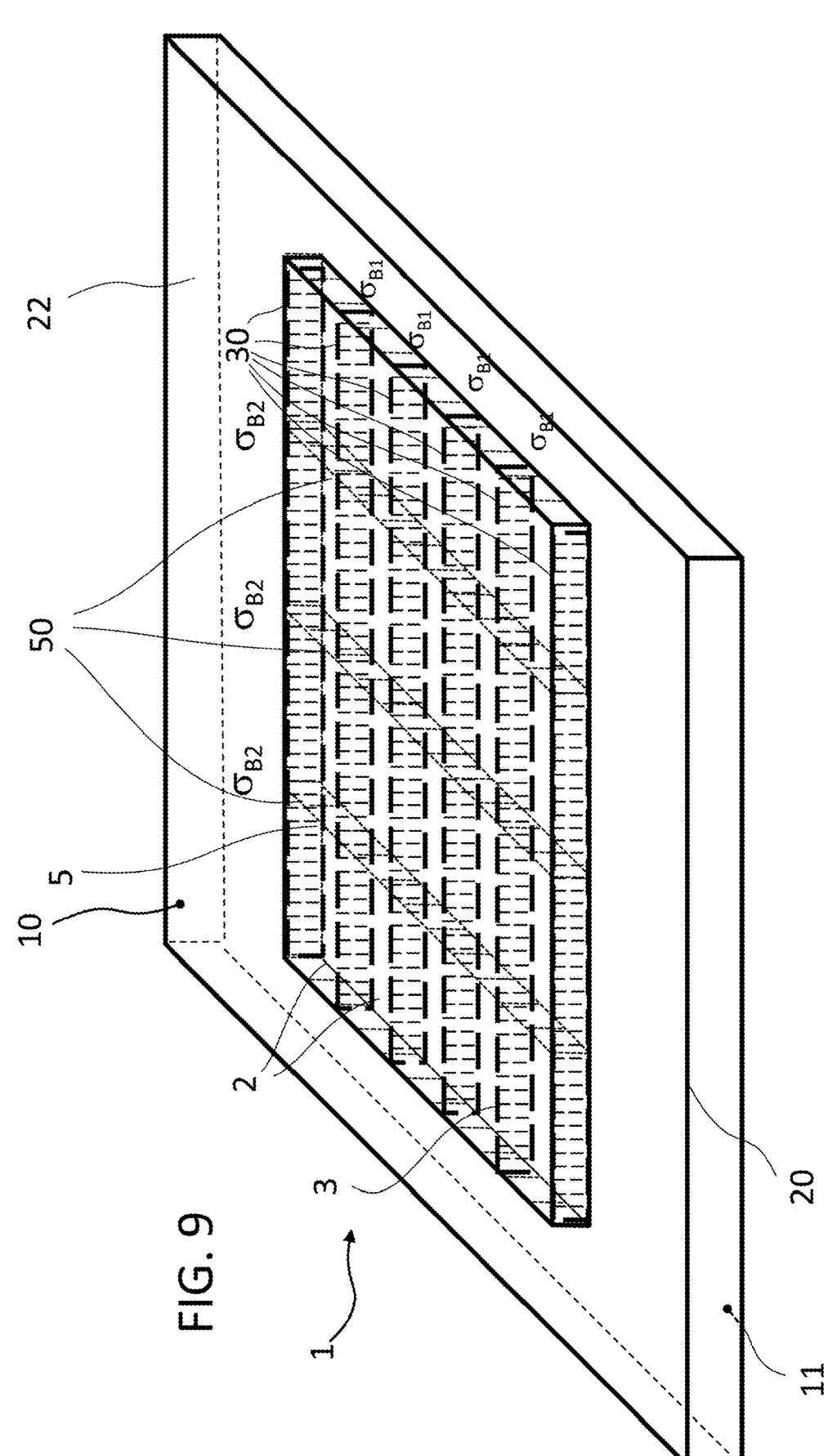
FIGS. 9 and 10 show variations of the exemplary embodiment of FIG. 6, with a frame for holding together the strip-wise separated workpiece.

According to a further embodiment, the workpiece 1 prepared for separation has a peripheral frame from which entire strips or individual portions can be broken out during singulation. This embodiment with a frame 22 is shown in FIG. 9. In this case, the handling frame may be preserved as a whole during the singulation process, or else it may be disintegrated step by step. As with the web 18 of the embodiment according to FIG. 8, the separation lines of one of the sets terminate at a distance from the edge 20 of the workpiece 1. In the case of a frame 22, this then applies to both sets 30, 50.

Figure 10:
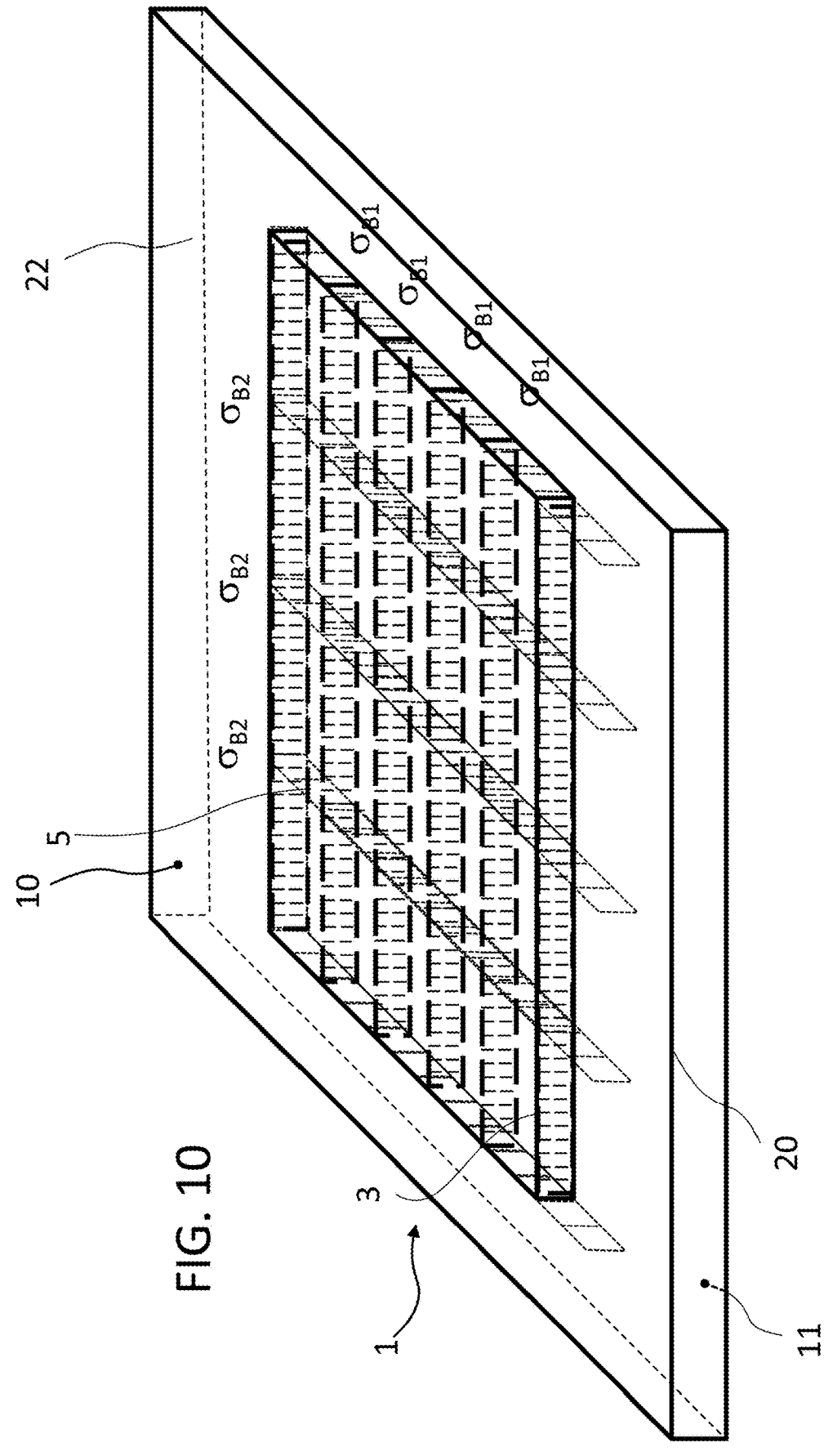

Other variants are also conceivable, in which the filamented separation lines partially protrude into the handling frame or into the handling strip, for example. An example of this is shown in FIG. 10. In this example, one side of the frame 22 is defined by the distance of the ends of the separation lines 5 from the edge 20, while the other sides of the frame are bounded by the longitudinal ends of the separation lines 3, 5.

Figure 11:
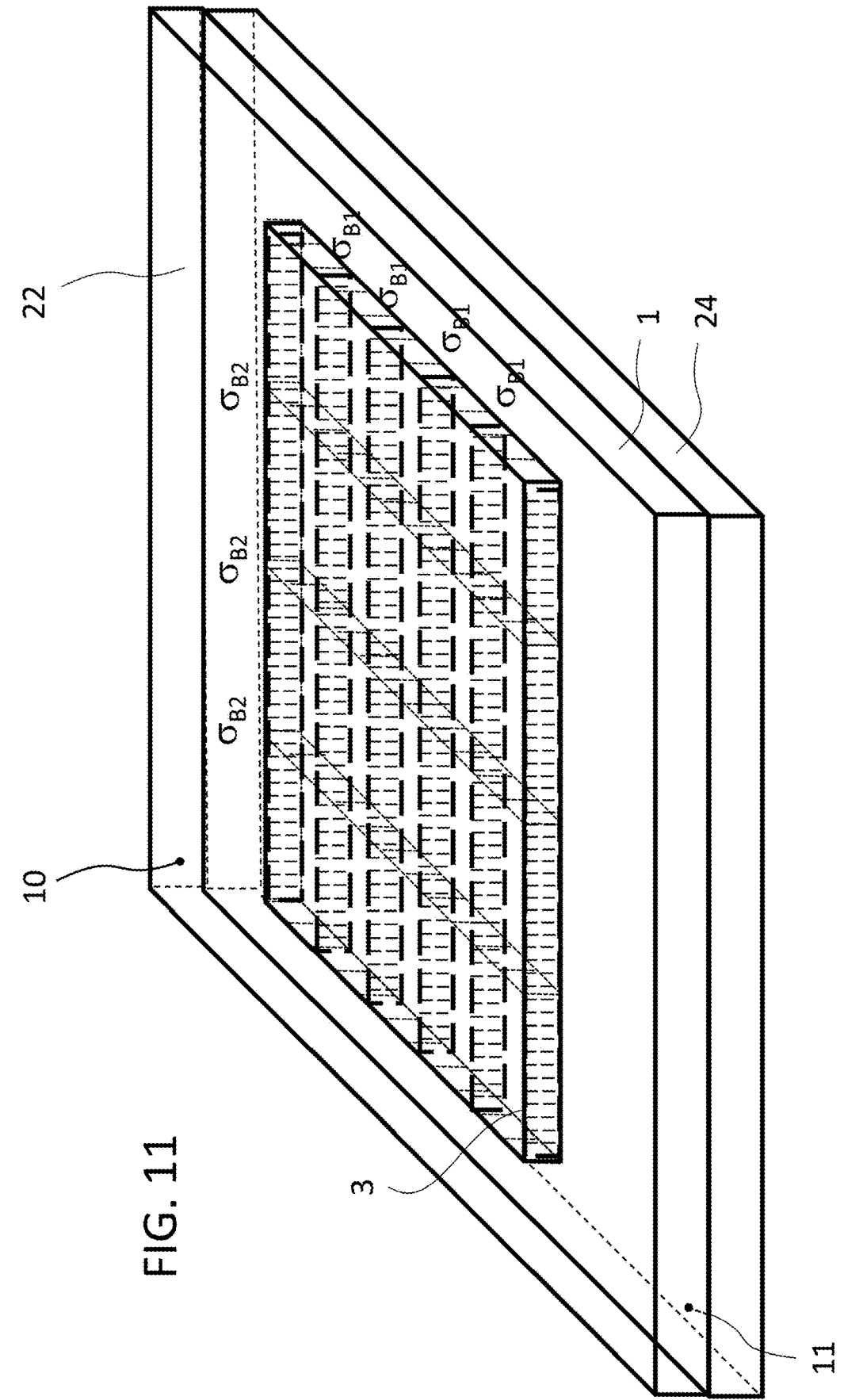
FIG. 11 shows a workpiece on a carrier substrate.

FIG. 11 shows an example which allows to handle a workpiece 1 according to the invention, for example for industrial further processing, while avoiding premature separation along the separation lines 3, 5. In this example, the workpiece 1 is secured on a carrier substrate 24 with one of its faces 11. The carrier substrate 24 may for instance be a glass wafer or a silicon wafer or a polymer such as a plastic sheet.

Figure 12:
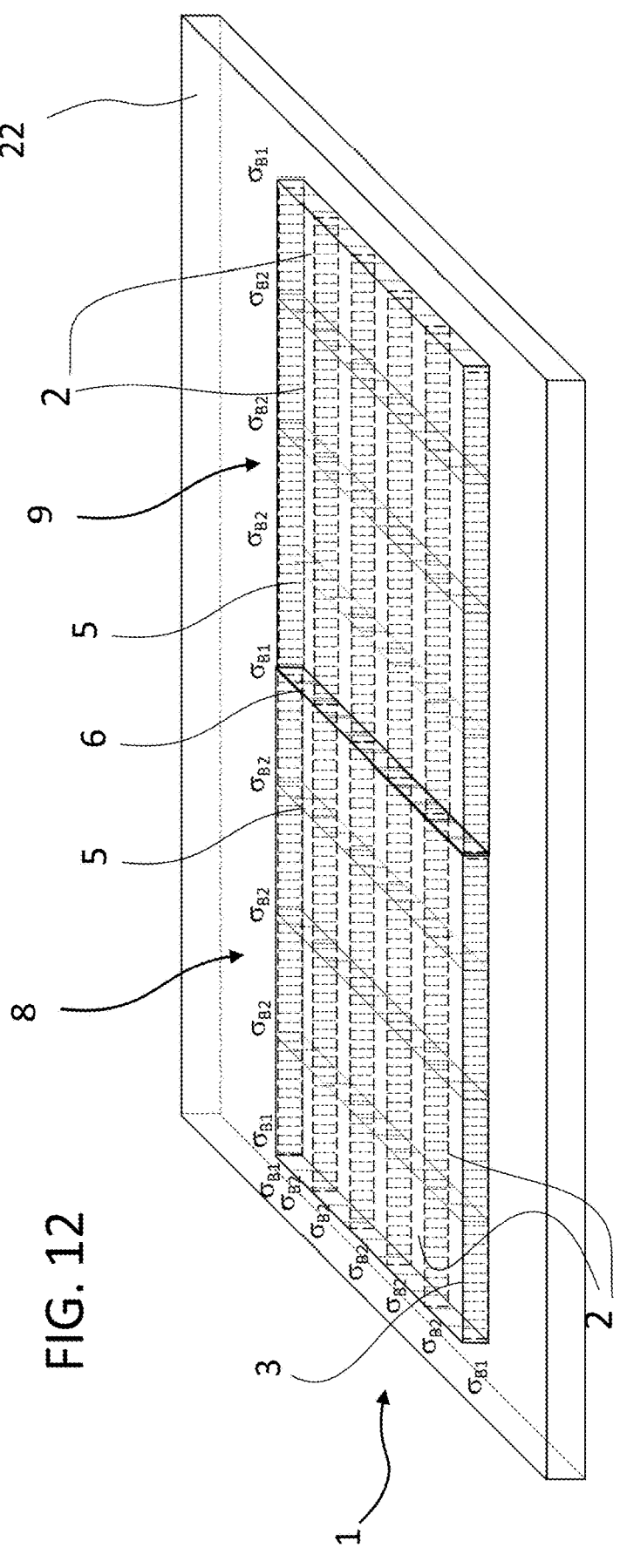
FIG. 12 shows an embodiment of a workpiece subdivided into a plurality of portions.

In the embodiment of FIG. 6, the spacing of the filamentary defects 7 and the breaking stress differ for different sets, the respective sets being defined by juxtaposed separation lines that do not cross each other. This does not preclude providing one or more of the juxtaposed separation lines with a different and in particular lower breaking stress. For example, according to a further embodiment, the substrate or workpiece 1 is subdivided, by a suitable choice of the breaking stresses, into a plurality of larger portions that may in turn be separated further. This subdivision need not be an actual separation but is to be understood in particular as a subdivision of the workpiece along the separation lines between the portions. In the example shown in FIG. 12, the workpiece 1 is subdivided into two portions 8, 9 along a separation line 6.

For example, only every n-th parallel separation line has the same breaking stress, and the separation lines therebetween have a different breaking stress value. In this case, any combination of parallel and perpendicular separation lines is possible. A respective variation of breaking stresses is possible, as mentioned above, by varying the pulse energy, number of bursts, or spacing of the introduced modifications. Conceivable would be a subdivision in which the separation line is at the boundary between the portions has a higher breaking stress than neighboring separation lines. However, in order to allow for a separation first into the portions 8, 9 and then further into individual elements 2, it is particularly preferred to set a lower breaking stress for the separation line(s) 6 than for the neighboring separation lines within the portions 8, 9. According to this embodiment of the invention, it is therefore contemplated that the workpiece 1 has a plurality of juxtaposed separation lines 5, 6, wherein at least one of the separation lines 6 extends between two adjacent separation lines 5, and wherein the separation line 6 extending between the two adjacent separation lines 5 has a lower breaking stress than the adjacent separation lines 5. Preferably, two sets of separation lines 5 exhibiting a higher breaking stress extend on both sides of the separation line 6 exhibiting the lower breaking stress, as in the example shown. The difference in the breaking stresses may generally be selected as in the embodiments with crossing separation lines, i.e. so as to preferably amount to at least 3 MPa, in particular at least 5 MPa.

All workpieces described herein may, in principle, be coated substrates as well. Optionally, the coating may also be applied prior to the laser-assisted introduction of the separation lines. According to one embodiment of the invention, an organic functional coating for protein or DNA analyzes may be applied as a coating. Thus, the workpiece 1 or an element 2 separable from the workpiece 1 can be used as a DNA or protein microarray. Suitable coatings for this purpose include aminosilanes, epoxysilanes, aldehyde silanes, hydrogels, streptavidin, and certain polymers. The coating may then be provided with a microarray of oligonucleotides, cDNA/PCR, bacterial artificial chromosomes (BACs), peptides, proteins, antibodies, glycans, or cell samples or tissue samples. In this way, the samples can be prepared together, and after having been separated they can then be examined and/or shipped separately.

LIST OF REFERENCE NUMERALS

1 Workpiece
2 Element
3, 5, 6 Separation line
7 Filamentary defect
8, 9 Portions of 1
10, 11 Faces of 1
30, 50 Sets of separation lines
13, 14, 15, 16 Edge surface
18 Web
20 Edge of 1
22 Frame
24 Carrier substrate

What is claimed is:

1. A workpiece comprising:

a glass product, glass ceramic product, or silicon product that has been pre-damaged along a separation line with defects at a spacing from one another along the separation line;

a breaking stress ($\sigma_B$) along the separation line is smaller than a first reference stress ($\sigma_{R1}$) of the glass product, glass ceramic product, or silicon product; and an edge strength ($\sigma_K$) of a separation edge obtained after separation at the separation line that is greater than a second reference stress ($\sigma_{R2}$) of the glass product, glass ceramic product, or silicon product, wherein the first reference stress ($\sigma_{R1}$) and the second reference stress ($\sigma_{R2}$) are equal and are a maximum thermal stress ($\sigma_{th}$) of the glass product, glass ceramic product, or silicon product, wherein the maximum thermal stress ($\sigma_{th}$) is defined according to a formula $\sigma_{th}=0.5\cdot\alpha\cdot E\cdot(T_g-100°\ C.)$, wherein $\alpha$ is a coefficient of thermal expansion of the glass product, glass ceramic product, or silicon product, wherein E is a Young's modulus of the glass product, glass ceramic product, or silicon product, and wherein $T_g$ is a glass transition temperature of the glass product, glass ceramic product, or silicon product.

2. The workpiece of claim 1, wherein $\sigma_{R1}\leq C_{R1}\cdot\alpha\cdot E\cdot(T_g-100°\ C.)$ applies to the first reference stress and $\sigma_{R2}\geq C_{R2}\cdot\alpha\cdot E\cdot(T_g-100°\ C.)$ applies to the second reference stress, wherein $C_{R1}$ and $C_{R2}$ are reference stress coefficients, with $C_{R1}=0.5/k$ and $C_{R2}=0.5\cdot k$, and with k=1.5, and wherein $\alpha$ is a coefficient of thermal expansion of the glass product, glass ceramic product, or silicon product, wherein E is a Young's modulus of the glass product, glass ceramic product, or silicon product, and wherein $T_g$ is a glass transition temperature of the glass product, glass ceramic product, or silicon product.

3. The workpiece of claim 1, wherein the glass product, glass ceramic product, or silicon product has been pre-damaged along two separation lines that cross each other.

4. The workpiece of claim 3, wherein the two separation lines have breaking stresses for separation that differ by at least 3 MPa and/or wherein the two separation lines have spacings of the defects that differ.

5. The workpiece of claim 1, further comprising at least two sets of juxtaposed separation lines, wherein a first set of the juxtaposed separation lines has an average breaking force that differs from an average breaking force of a second set of the juxtaposed separation lines by at least 3 MPa.

6. The workpiece of claim 5, wherein the first set of juxtaposed separation lines have ends that terminate at a distance from one of the edge such that a web or frame is formed between the ends and the edge so that separable elements remain attached to the web or frame after separation along the first set of juxtaposed separation lines.

7. The workpiece of claim 1, further comprising organic functional coating for protein or DNA analysis.

\* \* \* \* \*